(12) United States Patent
Brace et al.

(10) Patent No.: US 8,790,841 B2
(45) Date of Patent: *Jul. 29, 2014

(54) METAL ALLOY CATALYSTS FOR FUEL CELL CATHODES

(71) Applicants: Karen Marie Brace, Handbridge (GB); Brian Elliot Hayden, Southampton (GB); Christopher Edward Lee, Southampton (GB); Thierry Le Gall, Southampton (GB)

(72) Inventors: Karen Marie Brace, Handbridge (GB); Brian Elliot Hayden, Southampton (GB); Christopher Edward Lee, Southampton (GB); Thierry Le Gall, Southampton (GB)

(73) Assignee: Ilika Technologies Ltd., Chilworth, Southampton (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/672,449

(22) Filed: Nov. 8, 2012

(65) Prior Publication Data

US 2013/0130151 A1    May 23, 2013

Related U.S. Application Data

(63) Continuation of application No. 12/088,761, filed as application No. PCT/GB2006/050319 on Oct. 6, 2006, now Pat. No. 8,334,081.

(51) Int. Cl.

| | | |
|---|---|---|
| *H01M 4/92* | (2006.01) | |
| *C22C 38/18* | (2006.01) | |
| *C22C 38/00* | (2006.01) | |
| *C22C 5/04* | (2006.01) | |
| *C22C 19/07* | (2006.01) | |
| *B01J 23/89* | (2006.01) | |
| *H01M 8/10* | (2006.01) | |
| *H01M 8/04* | (2006.01) | |

(52) U.S. Cl.
CPC .... *B01J 23/8993* (2013.01); *H01M 2008/1095* (2013.01); *C22C 38/18* (2013.01); *H01M 8/1011* (2013.01); *C22C 38/002* (2013.01); *H01M 4/921* (2013.01); *C22C 5/04* (2013.01); *H01M 4/926* (2013.01); *C22C 19/07* (2013.01); *Y02E 60/523* (2013.01); *H01M 8/04261* (2013.01); *Y02E 60/50* (2013.01)
USPC .......................................... 429/487; 429/485

(58) Field of Classification Search
CPC .......... H01M 4/40; H01M 4/92; H01M 4/921
USPC .................. 429/525, 527, 485, 487; 420/463; 502/326
See application file for complete search history.

(56) References Cited

U.S. PATENT DOCUMENTS 2,226,079 A * 12/1940 Spanner .................... 420/463 X
2,780,543 A *  2/1957 Schneider et al. ............ 420/463

(Continued)

FOREIGN PATENT DOCUMENTS

| DE | 2440425 | 3/1976 |
|---|---|---|
| DE | 3146794 | 6/1983 |

(Continued)

OTHER PUBLICATIONS

Fernandez, José L., et al: "Pd—Ti and PD—Co—Au Electrocatalysts as a Replacement for Platinum for Oxygen Reduction in Proton Exchange Membrane Fuel Cells", Journal of the American Chemical Society, ACS Publications, US, vol. 127, No. (38), Sep. 28, 2005, pp. 13100-13101.

*Primary Examiner* — Zachary Best
(74) *Attorney, Agent, or Firm* — Cesari and McKenna, LLP

(57) ABSTRACT

A metal alloy catalyst for the oxygen reduction reaction in fuel cells is disclosed. The catalyst contains the metals Pd, M1 and M2. M1 and M2 are different metals selected from Co, Fe, Au, Cr and W, excluding the combination PdCoAu.

29 Claims, 38 Drawing Sheets

(56) References Cited

U.S. PATENT DOCUMENTS

| | | |
|---|---|---|
| 2,890,114 A | 6/1959 | Ruthardt et al. |
| 2,946,679 A | 7/1960 | Alan |
| 3,134,671 A | 5/1964 | Prosen |
| 3,155,467 A | 11/1964 | Yamamoto et al. |
| 4,098,605 A | 7/1978 | Nepela et al. |
| 4,195,988 A | 4/1980 | Ito |
| 4,201,577 A | 5/1980 | Agarwall et al. |
| 4,382,909 A * | 5/1983 | Zwingmann ............... 420/463 X |
| 4,681,735 A | 7/1987 | Groll et al. |
| 5,236,789 A | 8/1993 | Cowie et al. |
| 8,334,081 B2 * | 12/2012 | Brace et al. .................. 429/525 |
| 2002/0193865 A1 | 12/2002 | Radisch et al. |
| 2003/0077200 A1 | 4/2003 | Craig et al. |
| 2004/0074336 A1 | 4/2004 | Daimon et al. |
| 2004/0121219 A1 | 6/2004 | Meri et al. |
| 2004/0161641 A1 | 8/2004 | Lee et al. |
| 2005/0085379 A1 | 4/2005 | Ishihara et al. |
| 2006/0134505 A1 * | 6/2006 | Wang et al. .................... 429/40 |
| 2006/0135359 A1 | 6/2006 | Adzic et al. |
| 2006/0177728 A1 * | 8/2006 | Adzic et al. .................... 429/44 |
| 2007/0026292 A1 * | 2/2007 | Adzic et al. .................... 429/44 |

FOREIGN PATENT DOCUMENTS

| | | |
|---|---|---|
| EP | 0036556 | 9/1981 |
| EP | 0225668 | 6/1987 |
| EP | 0273137 | 7/1988 |
| EP | 0530697 | 3/1993 |
| EP | 1069200 | 1/2001 |
| EP | 1245704 | 10/2002 |
| EP | 1647605 | 4/2006 |
| GB | 1092471 | 1/1965 |
| GB | 1282000 | 7/1972 |
| GB | 2079787 | 1/1982 |
| GB | 2111528 | 7/1983 |
| GB | 2184593 | 6/1987 |
| JP | 63 125650 | 5/1988 |
| JP | 2005-135752 | 5/2005 |
| WO | 2004-053175 | 6/2004 |
| WO | 2005-067082 | 7/2005 |
| WO | WO-2006/086457 A2 | 8/2006 |
| WO | WO-2006/135396 A2 | 12/2006 |

* cited by examiner (a)

(b)

(c)

(a)

(b)

(c)

(a)

(b)

(c)

(a)

(b)

(c)

(a)

(b)

US 8,790,841 B2

METAL ALLOY CATALYSTS FOR FUEL CELL CATHODES

CROSS REFERENCE TO RELATED APPLICATIONS

This application is a continuation of U.S. application Ser. No. 12/088,761, filed on Jun. 9, 2008, which is a national phase of International Application No. PCT/GB2006/050319, filed on Oct. 6, 2006, which claims the benefit of priority to GB Application No. 0520473.0, filed on Oct. 7, 2005. The content of the prior applications are incorporated herein by reference in their entirety.

FIELD OF THE INVENTION

This invention is concerned with metal alloy catalysts for the oxygen reduction reaction (ORR) that takes place at the cathodes of proton exchange membrane (PEM) fuel cells.

BACKGROUND OF THE INVENTION

A fuel cell comprises a fuel electrode (anode), an oxidizer electrode (cathode), an electrolyte interposed between the electrodes and means for separately supplying a stream of fuel and a stream of oxidizer to the anode and the cathode, respectively. In operation, fuel supplied to the anode is oxidized releasing electrons which are conducted via an external circuit to the cathode. At the cathode the supplied electrons are consumed when the oxidizer is reduced. Proton exchange membrane fuel cells use a solid proton-conducting polymer membrane as the electrolyte.

Conventional fuel cells use hydrogen gas as the fuel. Pure hydrogen gas, however, is difficult and costly to supply. Thus, hydrogen gas is typically supplied to a fuel cell using a reformer, which steam-reforms methanol and water to a hydrogen-rich fuel gas containing carbon dioxide. Theoretically, this "reformate" gas consists of 75 vol. % hydrogen and 25 vol. % carbon dioxide. In practice, however, this gas also contains nitrogen, oxygen and, depending on the degree of purity, varying amounts of carbon monoxide. This process is complex, and the conversion of a liquid fuel directly into electricity would be desirable, as then a high storage density, system simplicity and retention of existing fueling infrastructure could be combined. Methanol is an especially desirable fuel because it has a high energy density, low cost and is produced from renewable resources. Thus, there is now a strong interest in the direct methanol fuel cell, in which the overall process that occurs is methanol and oxygen react to form water and carbon dioxide and electricity.

Conventionally platinum has been used as the cathode catalyst for ORR in PEM fuel cells. Because of the high cost of platinum, there has been interest to find non-platinum catalysts which will have comparable or increased activity relative to platinum. Palladium has been proposed as an alternative to platinum, because palladium is available at lower cost. Palladium-cobalt binary alloys have shown useful activity for ORR. However the present inventors have found that the stability of such alloys is less than is desired in practical applications for PEM fuel cells.

It is an object of this invention to provide palladium-based ternary alloys which are effective catalysts for ORR and which have improved stability relative to palladium-based binary alloys.

SUMMARY OF THE INVENTION

According to the present invention there is provided a metal alloy catalyst for the oxygen reduction reaction in proton exchange membrane fuel cells, the alloy containing the metals Pd, M1 and M2 where M1 and M2 are different metals selected from Co, Fe, Au, Cr and W; but excluding the combination PdCoAu.

In the alloys of this invention, in general one of M1 and M2 is an activating metal which increases the activity relative to Pd atone, and the other of M1 and M2 is a stabilising metal, or forms a stabilising metal combination M1M2, which improves the stability of the alloy for fuel cell use.

Preferably the catalyst is an alloy consisting essentially of the metals Pd, M1 and M2 where M1 and M2 are different metals selected from Co, Fe, Au, Cr and W (but excluding the combination PdCoAu).

In other words, the catalyst is preferably a ternary alloy consisting of the metals Pd, M1 and M2 where M1 and M2 are different metals selected from Co, Fe, Au, Cr and W and incidental inevitable impurities (but excluding the combination PdCoAu).

In another aspect the present invention provides a cathode for a PEM fuel cell comprising a cathode support and a catalyst of composition as defined above.

In a further aspect, the present invention provides a membrane-electrode assembly for a fuel cell comprising a proton exchange membrane, an anode and a cathode, in which the cathode includes an alloy catalyst of composition as defined above.

The invention also provides a fuel cell comprising at least one membrane-electrode assembly of a proton exchange membrane, an anode and a cathode which includes an alloy catalyst of composition as defined above.

DESCRIPTION OF THE INVENTION

In its broadest aspect, the present invention is a metal alloy catalyst for the oxygen reduction reaction in fuel cells, the alloy comprising the metals Pd, M1 and M2, where M1 and M2 are different metals selected from Co, Fe, Au, Cr or W; but excluding the combination PdCoAu.

The present invention has been developed by depositing and screening thin films of binary and ternary alloys containing palladium, M1 and/or M2, using the "Physical Vapour Deposition Method for the High-Throughput Synthesis of Solid-State Material Libraries" disclosed by Guerin et al in J. Comb. Chem. 2006, 8, 66 and using the screening method disclosed by Guerin et al in "Combinatorial Electrochemical Screening of Fuel Cell Electrocatalysts" in J. Comb. Chem.

2004, 6, 149 and "High-Throughput Synthesis and Screening of Ternary Metal Alloys for Electrocatalysis" in J. Phys. Chem. B, 2006, 110, 14355. As indicated in the Examples below, by use of this screening technique binary alloys of composition Pd and M1 or M2 can be optimised for the ORR; also it can be determined where inclusion of M2 or M1 into the optimum binary alloy compositions provides an alloy containing PdM1M2 with effective ORR activity, preferably superior to Pd alone, and with improved stability. As a result, the metal alloys suitable for use as catalysts for the cathodes of PEM fuel cells are identified.

In particular, the present inventors have established that binary alloys of composition PdM1 where M1 is Co or Fe can be optimised for the ORR, and that inclusion of M2 where M2 is Au, Cr, W or Fe into the optimum binary alloy compositions provides an alloy containing PdM1M2 with ORR activity superior to Pd alone and with improved stability.

In one preferred group of catalysts M1 is Fe and M2 is Au, Cr, Co or W.

For the catalyst composition PdFeAu, a region of special interest for effective ORR has from 50-70 At. % Pd, 50-30 At. % Fe and up to 20 At. % Au.

Figure 37:
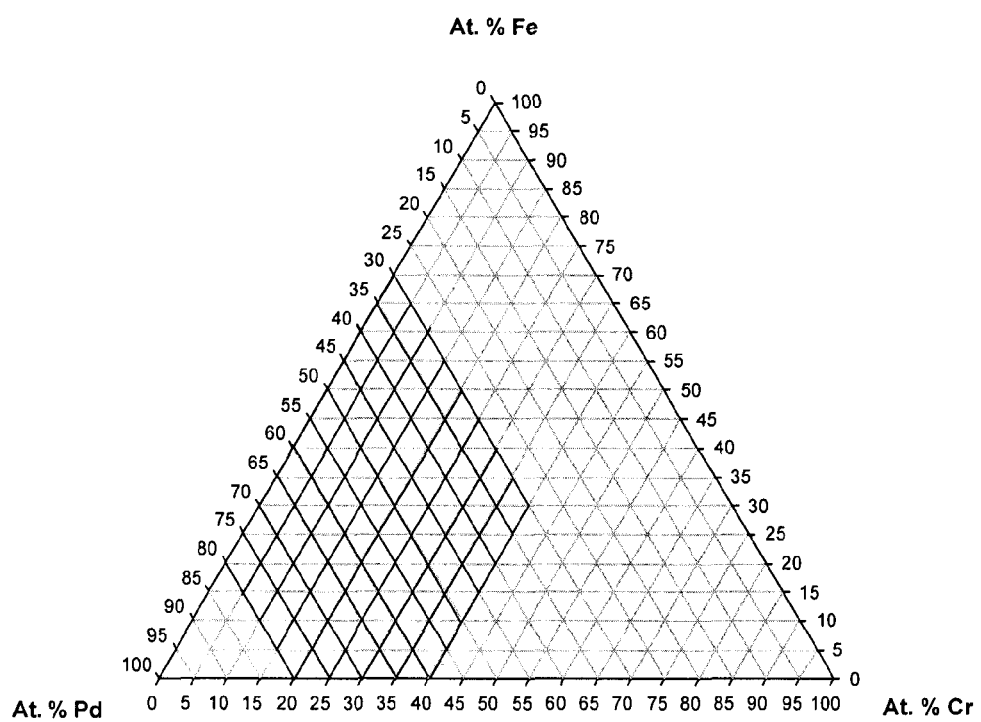
FIG. 37 shows (hatched area) regions of special interest for the PdFeCr system.

For the catalyst composition PdFeCr, a region of special interest for effective ORR has from 30-80 At. % Pd, 20-70 At. % Fe and up to 40 At. % Cr. Compositions of special interest for the system PdFeCr are also found in the hatched area of the ternary diagram in FIG. 37.

The binary catalyst PdFe, and use thereof as a catalyst in fuel cells, forms a further aspect of this invention.

In another preferred group of catalysts M1 is Co and M2 is Cr or W.

Figure 22:
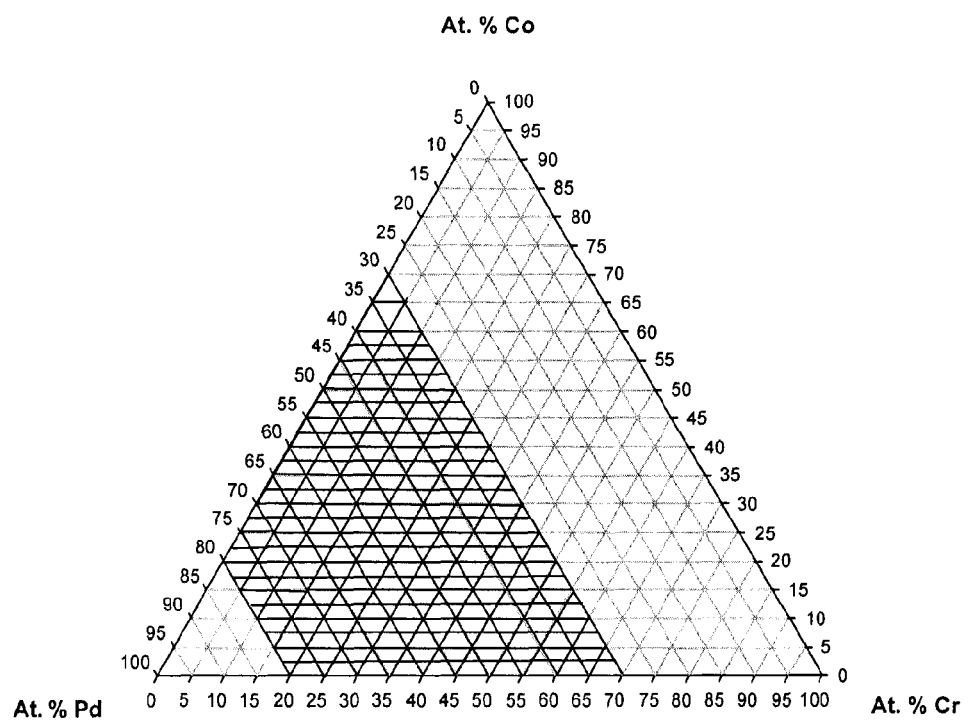
FIG. 22 indicates (the hatched area) regions of special interest in the PdCoCr system, based on the data of TERNARY EXAMPLEs 7 to 9.

For the catalyst composition PdCoCr, a region of interest for high activity has a composition range of 30 to 80 At. % Pd; the high activity is maintained at up to 30 At. % Cr. Another region of interest is at 30-60 At. % Pd and 30-70 At. % Co and 0-20 At. % Cr. However a more stable region appears with the amount of Co decreased to 10-30 At. % and the amount of Cr increased to 20-40 At. %. Compositions of special interest for the system PdCoCr are also found in the hatched area of the ternary diagram shown in FIG. 22.

Figure 30:
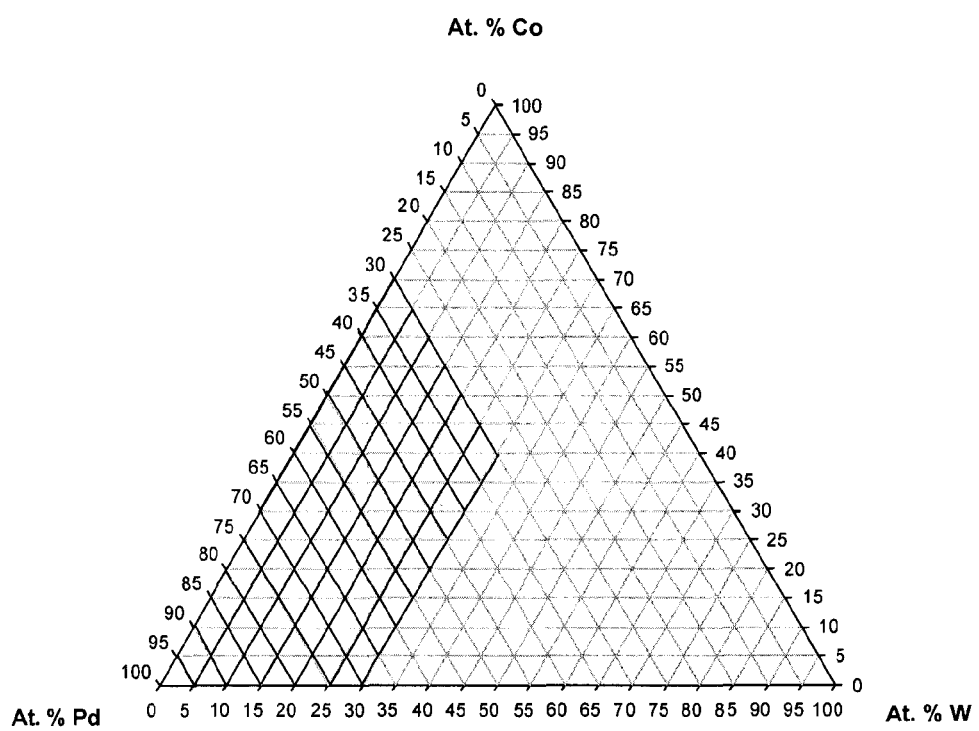
FIG. 30 shows (hatched area) regions of special interest for the PdCoW system.

For the catalyst PdCoW, a region of interest for high activity has a composition range of 30 to 80 At. % Pd. The high activity is maintained at up to 20 At. % W. However a more stable region appears with the amount of Pd increased to 60-80 At. % and the amount of Co less than 40 At. %. The most active alloys contain 20-60 At. % Pd, 30-70 At. % Co and 0-30 At. % W, while more stable alloys are composed of more than 60 At. % Pd, less than 40 At. % Co and less than 20 At. % W. Compositions of special interest for the system PdCoW are also found in the hatched area of the ternary diagram shown in FIG. 30.

The binary alloy catalysts PdCr and PdW, and use thereof as catalysts in fuel cells, form another aspect of this invention.

The alloys of the present invention, may be used in proton exchange membrane fuel cells in which oxygen is electrochemically reduced at the cathode. Typical cells include hydrogen/oxygen fuel cells, hydrogen/air fuel cells, and direct liquid fuel cells including DMFC (Direct Methanol Fuel Cells) with protonic electrolytes.

Ternary alloys suitable for use as catalysts for fuel cell electrodes in accordance with the present invention may be selected from the group consisting of PdCoCr, PdCoW, PdFeCr, PdFeW, PdCrW, PdWAu, PdCrAu, PdCoFe and PdFeAu.

In general, the ternary cathode catalysts and cathode electrodes of the present invention may be used in fuel cells wherein the anode reaction involves catalytic oxidation of any fuel containing hydrogen e.g., hydrogen and reformated-hydrogen fuels and hydrocarbon-based fuels. Applicable hydrocarbon-based fuels include saturated hydrocarbons such as methane (natural gas), ethane, propane and butane; waste-tip off-gas; oxygenated hydrocarbons such as methanol and ethanol; and fossil fuels such as gasoline and kerosene; and mixtures thereof. The preferred fuel, in view of the fact that the ORR activities of the Pd-based catalysts of this invention are not affected by methanol crossover, is methanol.

In the case of DMFC, methanol crossover degrades the catalytic activity of ORR when Pt is used as the cathode catalyst. On the other hand, the ORR activity of Pd and Pd alloy catalyst are not affected by methanol crossover. Therefore, when used in DMFC, the catalysts of the present invention are superior to Pt catalyst from the viewpoint of not only the cost but also the cell performance.

Accordingly an advantageous aspect of the invention is a DMFC in which ternary alloys of the invention are used as catalysts for ORR.

In the screening methods used in the present invention to assess the properties of the ternary alloys, the alloys are prepared by blending the component metals using the techniques disclosed in WO 2005/035820, the entire disclosure of which is incorporated herein by reference. For preparation of alloys on a larger scale for use in cathodes, conventional alloy preparation techniques which will be familiar to those skilled in this technology may be used, such as sputtering, reduction of metal oxide mixtures, reduction of mixed salts deposited from solutions and other known techniques may be used. The resultant alloys may contain incidental or inevitable impurities arising from the production process, so far as these do not affect the desired activity.

Some typical preparation methods that may be used are described by Sinfelt in Ann. Rev. Mat. Sci., 1972, 2, 641 "Highly Dispersed Catalytic Materials" and more recently by Chan et al. in J. Mater. Chem., 2004, 14, 505 "Supported Mixed Metal Nanoparticles as Electrocatalysts in Low Temperature Fuel Cells". There are of course many alternate methods that may be used or envisaged by persons skilled in the art of dispersed catalyst synthesis.

The alloy catalysts may be deposited directly on the surface of a proton exchange membrane for contact with a current collector. Alternatively the alloy catalysts may be deposited on the surface of a cathode support, or within the pores of a porous cathode support, such as a carbon structure that is placed in contact with the membrane.

Carbon supported catalysts are normally used for fuel cells because surface area of catalysts is greatly increased by using carbon support and carbon has sufficient electronic conductivity and chemical stability under fuel cell operating conditions. The preparation of dispersed alloy on carbon supports may be achieved in a number of ways. For instance, the alloy catalysts may be formed by reduction of a mixture of compounds of component metals, or heat treatment of carbon supported Pd wherein the other metal salts are precipitated or adsorbed onto the surface. Alternatively, the alloy particles may be formed on the carbon supports by physical deposition, such as sputtering, physical evaporation and chemical vapour deposition.

The proton exchange membrane (PEM) is typically a polymeric ion exchange membrane, especially a perfluorinated ionomer membrane such as perfluorosulfonated membranes, for example the commercially available Nafion™ membrane and its derivatives produced by du Pont. Nafion™ is based on a copolymer made from tetrafluoroethylene and perfluorovinylether, and is provided with sulfonic groups working as ion-exchanging groups. Other suitable proton exchange membranes are produced with perfluorinated monomers such as octafluorocyclobutane and perfluorobenzene.

The membrane electrode assemblies (MEA), which also include an anode, having a hydrogen oxidation or liquid fuel oxidation catalyst structure, on the opposite surface of the membrane, may be assembled in series as MEA stacks to form fuel cells.

The fuel cells include means for supplying oxygen or an oxygen-containing gas such as air to the cathode catalyst for ORR and means for supplying a hydrogen-containing gas or liquid such as methanol to the anode catalyst for generation of protons. Typically air is supplied to the cathode and pure hydrogen to the anode. Gas supply channels may be formed within porous cathode and anode support structures, or gas flow field plates may be placed in contact with the cathode(s) and anode(s).

The detailed construction of PEM fuel cells is well known to those familiar with such technology and does not form part of the inventive subject matter of this invention as such. Typically the fuel cell comprises an anode, a cathode, a proton exchange membrane between the anode and the cathode, and catalysts for the catalytic oxidation of a hydrogen-containing fuel and for the reduction of oxygen.

A typical direct methanol fuel cell (DMFC) has a methanol electrode (fuel electrode or anode) and an air electrode (oxidizer electrode or cathode). In between the electrodes, a proton exchange membrane serves as an electrolyte. The proton exchange membrane, the anode and the cathode are generally integrated into one body, so there is no contact resistance between the electrodes and the proton exchange membrane. Electricity is generated by methanol oxidation by introducing methanol into a methanol fuel chamber open to the anode, while oxygen, preferably as air, is introduced into an air chamber open to the cathode. The methanol is oxidised at the anode to produce carbon dioxide gas, hydrogen ions and electrons. An electric current is withdrawn from the fuel cell into an outer circuit by current collectors in contact with the electrodes. Hydrogen ions migrate through the acidic proton exchange membrane and react with oxygen and electrons from the outer circuit at the cathode to form water. The methanol may be introduced as a dilute solution, which may be acidic, to enhance the chemical reaction and increase power output.

The invention and its efficacy are further illustrated in the following Examples. The Examples detail experiments where the samples of thin film alloys were deposited using the techniques of WO 2005/035820 and assessed by the HT-PVD technique disclosed by Guerin et al in J. Comb. Chem. 2006, 8, 66, "Physical Vapour Deposition Method for the High-Throughput Synthesis of Solid-State Material Libraries". The entire disclosure of both documents is incorporated herein by reference. The substrates for electrochemical screening were electrochemical arrays consisting of a 10 by 10 arrangement of gold electrodes on a silicon nitride wafer substrate.

High-throughput electrochemical screening (HT-ES) consists of recording the current at all 100 electrodes on an array simultaneously (pseudo parallel data acquisition). This is achieved by means of a 100 channel current follower, a common potential control for all electrodes and a specifically designed data acquisition software, as disclosed by Guerin et al. in J. Comb. Chem. 2004, 6, 149, "Combinatorial Electrochemical Screening of Fuel Cell Electrocatalysts" and in J. Phys. Chem. B, 2006, 110, 14355, "High-Throughput Synthesis and Screening of Ternary Metal Alloys for Electrocatalysis".

The ORR testing described in the examples provides an effective model for the suitability of alloy samples as the catalyst at the cathode of a PEM fuel cell. During the steady state ORR experiments the potential was applied in steps from 0.7 to 0.9, then back to 0.7 V vs. a reversible hydrogen electrode (RHE) using 50 mV steps at intervals of 90 s per step. Oxygen gas was bubbled through the electrolyte throughout the experiment. All experiments were carried out in 0.5 M $HClO_4$ (aq) electrolyte and at room temperature (20° C.).

During cyclic voltammetry experiments the potential was cycled between 0.4 and 1.2 V vs. RHE at 50 mV s.sup.−1. All experiments were in oxygen-free 0.5 M $HClO_4$ (aq) electrolyte and at room temperature (20° C.).

PREPARATION EXAMPLE 1

Figure 1:
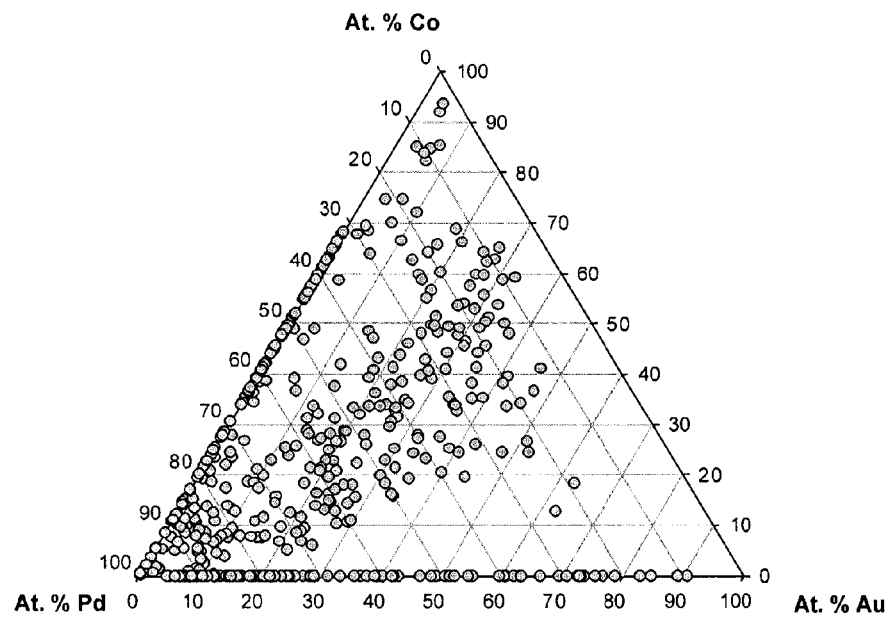
FIG. 1 shows the entire set of PdCo and PdCoAu compositions deposited and screened for ORR in BINARY EXAMPLEs 1-3 and TERNARY EXAMPLEs 1-5.

For assessment of the PdCoAu system 3 ternary PdCoAu samples were prepared using the techniques of WO 2005/035820. The compositions of the samples were measured using energy dispersive spectroscopy (EDS) and are quoted as atomic percents (At. %). The range of compositions prepared were: (1) At. % Pd (7.6 to 73.1), At. % Co (5.1 to 65.0), and At. % Au (16.5 to 47.2), (2) At. % Pd (12.9 to 89.9), At. % Co (0.2 to 70.4), and At. % Au (6.7 to 50.9), and (3) At. % Pd (2.5 to 98.1), At. % Co (0 to 93.5), and At. % Au (0 to 63.0). The range of compositions prepared for the binary PdAu and PdCo samples were (4) At. % Pd (9.4 to 95.5) and At. % Au (4.5 to 90.6) and (5) At. % Pd (31.8 to 99.7) and At. % Co (0.3 to 68.2). For the screened samples in the PdCoAu ternary and binary phase spaces, all the compositions tested are plotted on FIG. 1 in atomic percentages. The activity of the AuCo binary space was not screened for ORR activity, as it is not likely that this area of the ternary composition space will show any activity at reasonable operating potentials. In addition the activity of the pure Pd component was determined using an array composed of 100 identical Pd electrodes. In total 600 thin film samples were prepared and screened for oxygen reduction activity in order to populate the composition activity space for the PdCoAu alloy system.

PREPARATION EXAMPLE 2

Figure 11:
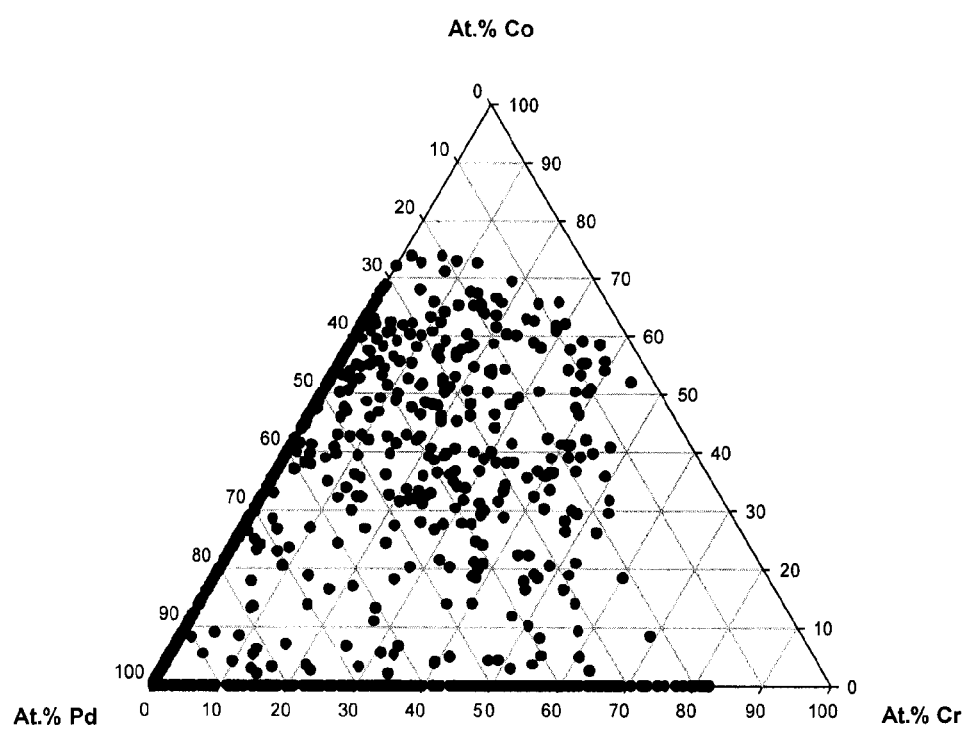
FIG. 11 shows composition of all PdCr and PdCoCr thin films prepared by deposition and electrochemically screened in BINARY EXAMPLEs 5 and 6 and TERNARY EXAMPLEs 7-9.

For the PdCoCr alloy system, in total 1100 thin film samples were similarly prepared and screened for oxygen reduction activity in order to populate the composition activity space. The range of compositions prepared and tested is shown in FIG. 11

PREPARATION EXAMPLE 3

Figure 23:
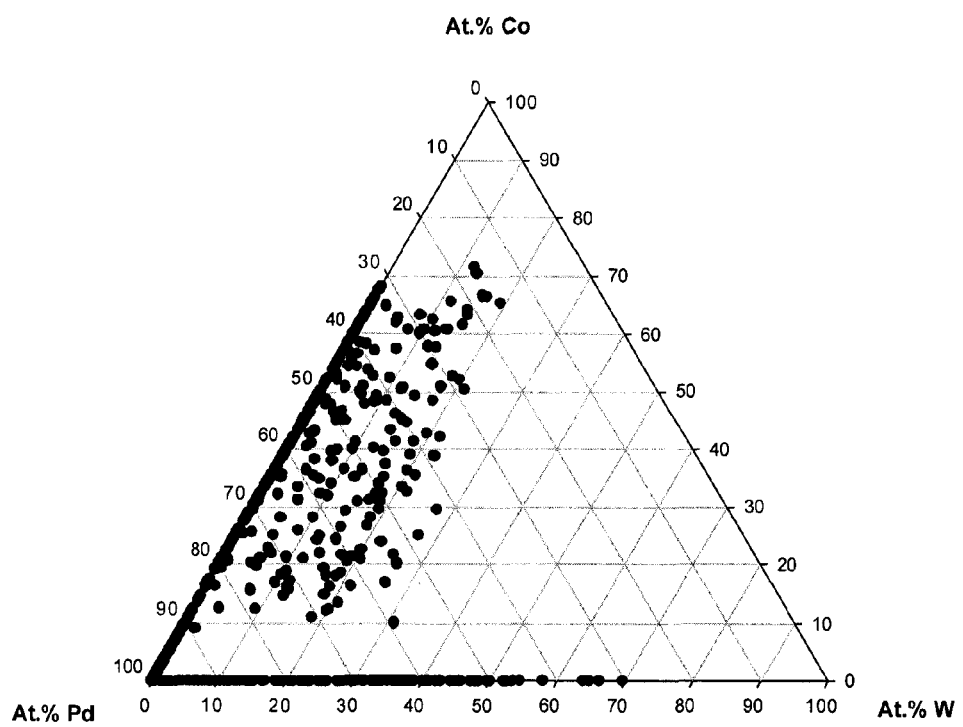
FIG. 23 shows the composition in At. % of PdCo, PdW and PdCoW thin films deposited and electrochemically screened in TERNARY EXAMPLEs 10-13.

For the PdCoW system, in total 700 thin film samples of PdCo, PdW and PdCoW alloys were prepared and screened for oxygen reduction activity. The compositions of the samples were measured using energy dispersive spectroscopy (EDS) and are quoted as Atomic %. FIG. 23 shows the entire set of binary and ternary compositions deposited and screened for oxygen reduction reaction.

PREPARATION EXAMPLE 4

Figure 31:
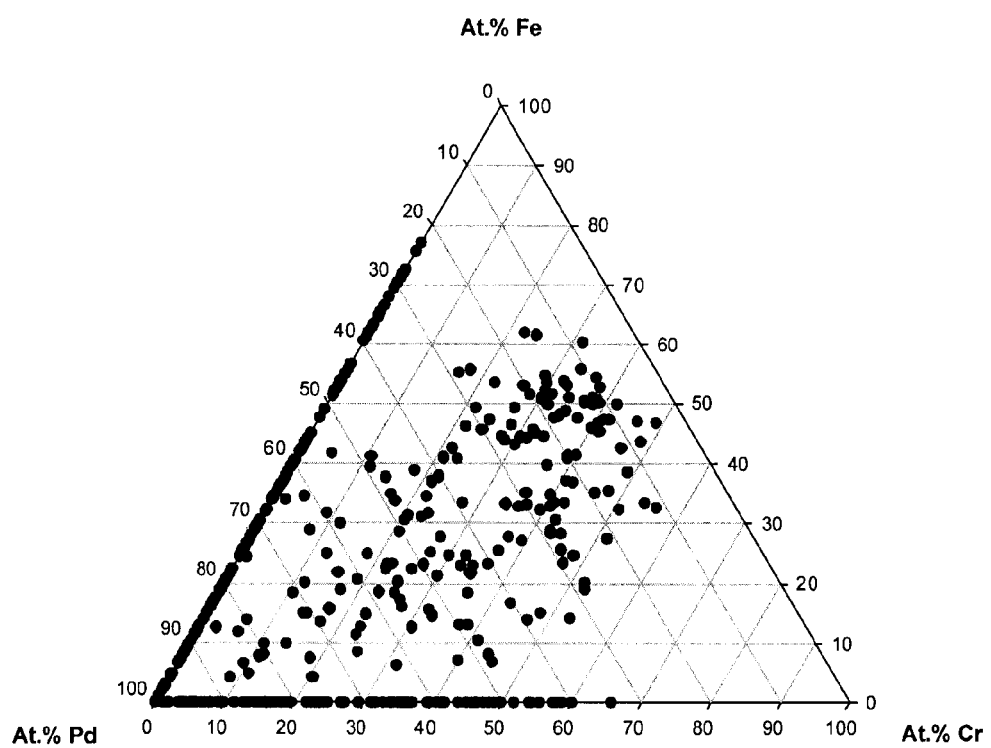
FIG. 31 shows the composition of PdFe, PdCr and PdFeCr thin films deposited and electrochemically screened in TERNARY EXAMPLEs 14-16.

For the PdFeCr system in total 700 thin film samples of PdFe, PdCr and PdFeCr alloys were prepared and screened for oxygen reduction activity. The compositions of the samples were measured using energy dispersive spectroscopy (EDS) and are quoted as Atomic %. FIG. 31 shows the entire set of binary and ternary compositions deposited and screened for oxygen reduction reaction.

BINARY EXAMPLE 1

Figure 2:
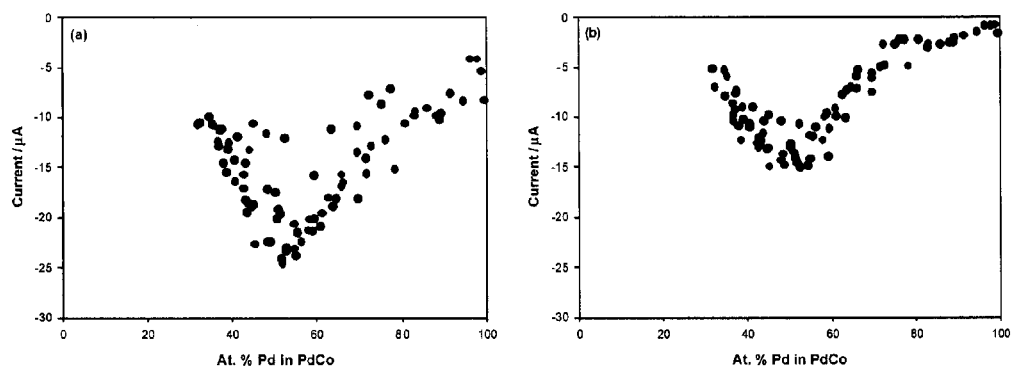
FIG. 2 shows a plot of the steady-state currents for the reduction of oxygen for the PdCo binary system in 0.50 M $HClO_4$ (aq) at (a) 0.70 V and (b) 0.80 V vs. RHE, based on the data of BINARY EXAMPLE 1.

The steady state current for oxygen reduction for the PdCo binary system at 0.70 V and 0.80 V vs. RHE was measured. FIG. 2 shows the steady state currents for oxygen reduction at 0.70 V (FIG. 2a) and 0.80 V (FIG. 2b) vs. RHE. The data shows there was a clear maximum in the oxygen reduction activity for compositions of PdCo with a 50:50 ratio of atomic percents. This optimum composition for the PdCo binary system was independent of the applied potential. In both cases the activity of the optimum composition was much greater than for 100 At. % Pd and was approximately 4 times as great at 0.7 V and 7 times as great at 0.8 V.

BINARY EXAMPLE 2

The specific activities of the PdCo binary system toward oxygen reduction at 0.70 V vs. RHE were assessed using surface areas calculated from the charge for oxidative stripping of CO adsorbed at Pd atoms in the surface of the sample.

The charge for CO oxidative stripping was measured by saturating the surface of the samples with CO by bubbling CO gas through the electrolyte for 20 min while applying a potential of 0.1 V vs. RHE to the array. Subsequently argon gas was then bubbled through the electrolyte for 5 min. while maintaining the same applied potential to rid the solution of any dissolved but unadsorbed CO. The array was then cycled between 0.0 V and 1.2 V vs. RHE for 4 cycles at 50 mV s.sup.−1. Using the cyclic voLtammogram, the anodic charge between 0.5 and 1.2 V was calculated for the first and fourth cycle. The charges associated with oxidation of a monolayer of adsorbed carbon monoxide (CO(ads)) were determined by subtracting the charge associated with the formation of the surface oxide layer (Q.sub.O) (fourth cycle) from the charge associated with the concomitant formation of the surface oxide layer and oxidation of the adsorbed carbon monoxide ($Q_{CO+O}$) (first cycle).

$$Q_{CO} = Q_{CO+O} - Q_O \quad [1]$$

The carbon monoxide charges were converted to surface area estimates by dividing them by the constant 420.mu.Cc-m.sup.−2. This is the value used for the determination of the real surface area of polycrystalline platinum electrodes that also assumes complete coverage, 1 CO(ads) per surface Pt atom, and 2 e− for the oxidation of each CO(ads) to $CO_2$.

Figure 3:
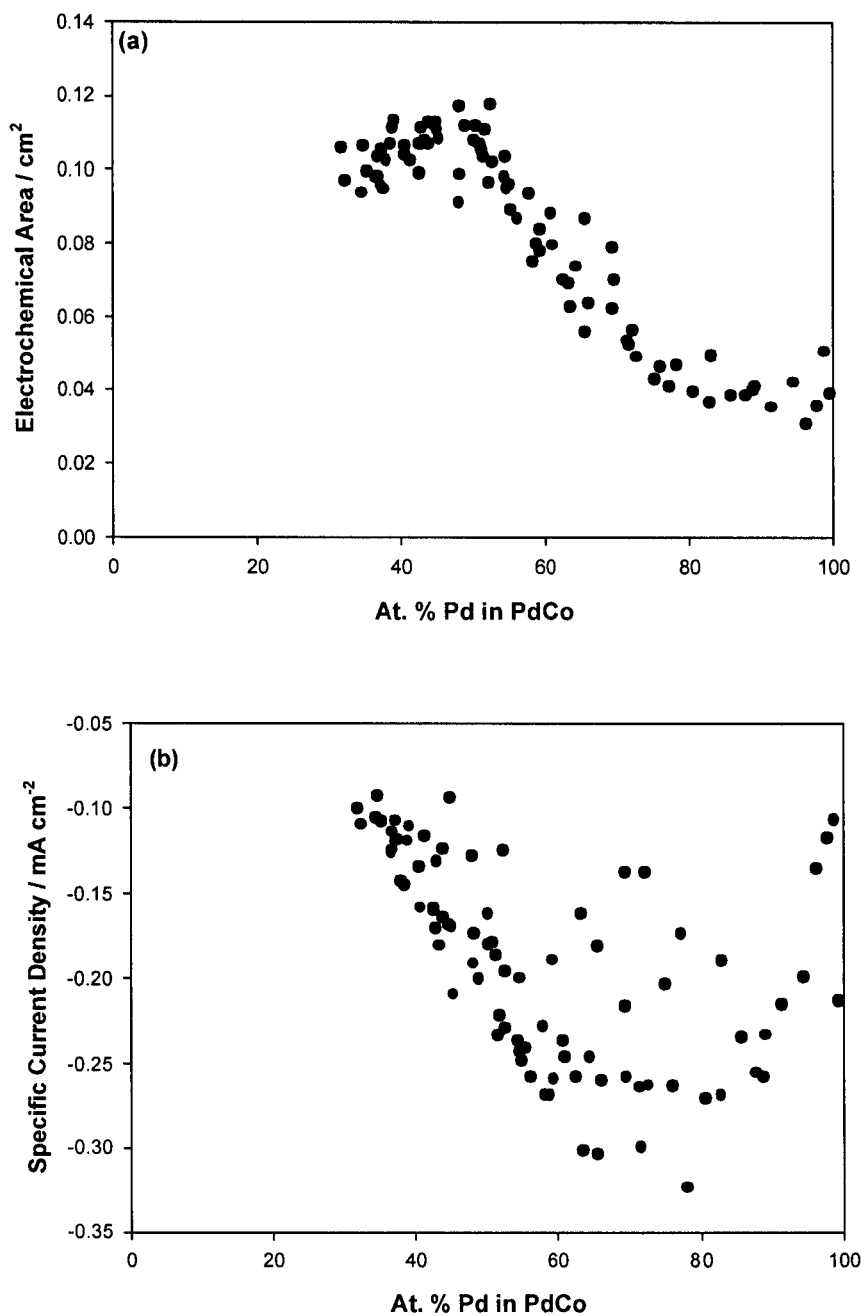
FIG. 3 plots (a) the data of surface area for the PdCo binary system estimated from the CO(ads) oxidation charge and (b) data of the specific current densities for the reduction of oxygen at 0.70 V vs. RHE in 0.50 M $HClO_4$ (aq) based on the data of BINARY EXAMPLE 2.

FIG. 3(a) shows the resultant surface areas estimates. The data shows that there was a large increase in surface area of the samples for compositions with less than 80 At. % Pd, this area increased reached a maximum at 50 At. % Pd. This area increase is thought to be due to dissolution of Co from the binary alloy.

FIG. 3(b) shows the data of FIG. 2(a) divided by the surface area estimates giving the specific current activities of the PdCo binary system for oxygen reduction. The specific activity data for the binary has a maximum activity at 70-80 At. % Pd. That there is still a maximum in activity following surface area correction is evidence that adding Co to Pd has an electronic effect that increases the activity of the alloy towards ORR over that observed for either Pd or Co in the pure state.

BINARY EXAMPLE 3

Figure 4:
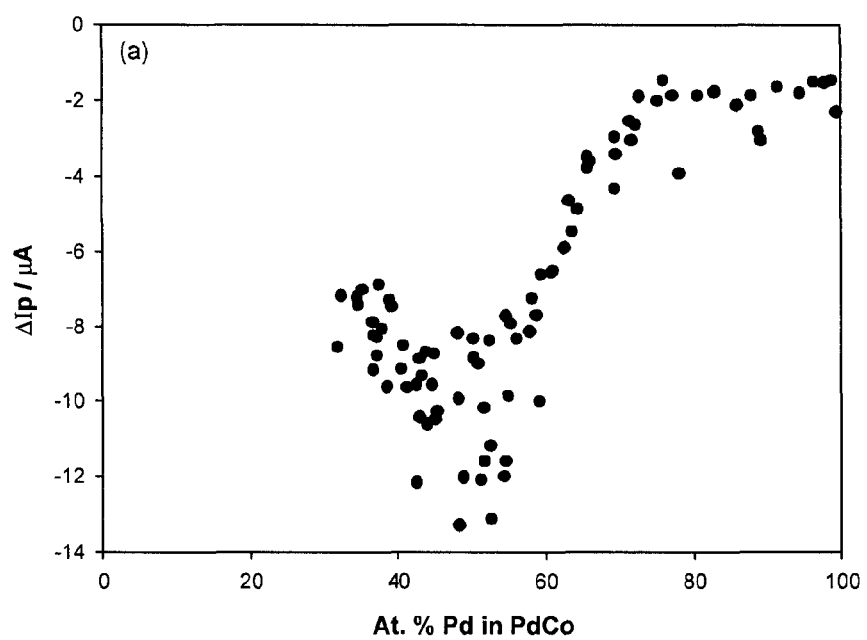
FIG. 4 shows the decrease in the surface oxide reduction peak current for the PdCo binary system as measured from cyclic voltammograms recorded before and after the steady state oxygen reduction screening experiments in 0.50 M $HClO_4$ (aq), based on the data of Binary Example 3.

The difference between the peak current for the surface oxide reduction of the samples from the cyclic voltammograms recorded before and after the oxygen reduction screening experiments in 0.50 M $HClO_4$ (aq) is used as a preliminary indication of sample stability. It is apparent from FIG. 4 that the change in peak current is quite significant for the optimum PdCo compositions. This suggests that the increase in activity of these PdCo materials comes at the expense of stability.

TERNARY EXAMPLE 1

Figure 5:
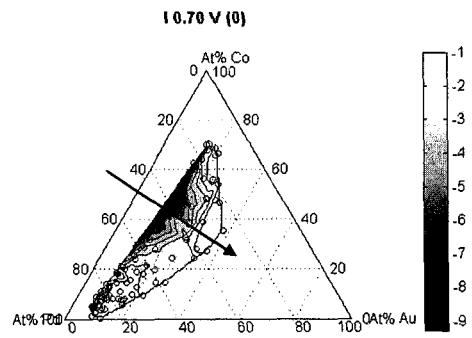
FIG. 5 plots the steady-state oxygen reduction currents for a PdCoAu ternary array at (a) 0.70 V, (b) 0.75 V, and (c) 0.80 V vs. RHE in 0.5 M $HClO_4$ (aq), as discussed in Ternary Example 1. The z-axes in each case are in µA.
Figure 5:
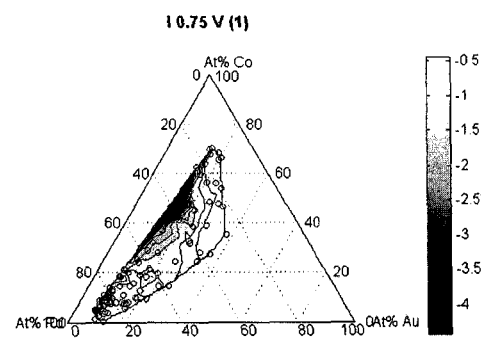
Figure 5:
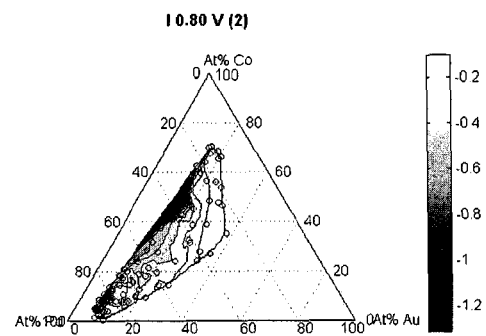

The steady state ORR current for one of the PdCoAu arrays was investigated. The steady-state oxygen reduction currents at (a) 0.70 V, (b) 0.75 V, and (c) 0.80 V vs. RHE are respectively shown in FIGS. 5(a), 5(b) and 5(c) in 0.5 M $HClO_4$ (aq). It is clear from this Figure that the region of highest activity is in the composition range of 40 to 60 At. % Pd. The arrow in FIG. 5(a) shows the direction of the decreasing activity that is brought about by the addition of increasing amounts of Au to the alloys.

TERNARY EXAMPLE 2

Figure 6:
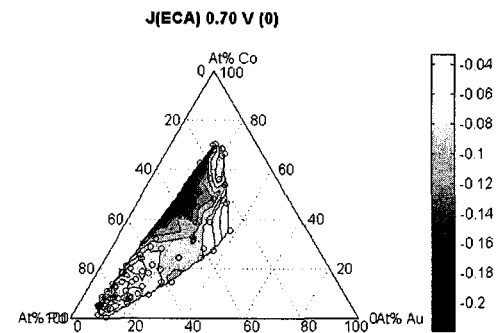
FIG. 6 plots the specific current densities for a PdCoAu ternary array for the steady-state oxygen reduction (5a) at 0.70 V, (5b) at 0.75 V, and (5c) at 0.80 V vs. RHE in 0.5 M $HClO_4$ (aq), as discussed in TERNARY EXAMPLE 2. The z-axes in each case are in mA $cm^{-2}$.
Figure 6:
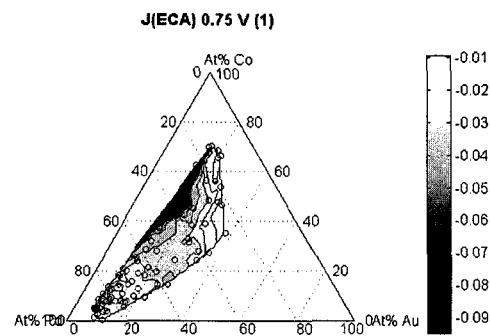
Figure 6:
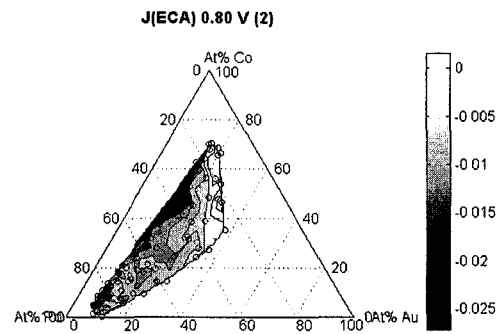

The data of TERNARY EXAMPLE 1 was reworked as specific activities. The specific activities shown in FIG. 6 were calculated using the surface areas measured from the CO oxidative stripping charges (as explained in BINARY EXAMPLE 2). After converting the currents shown in FIG. 5 to the specific current densities shown in FIG. 6, there remained a peak in ORR activity that was attributable to a increase in the intrinsic activity of the material and was not a result of increased surface roughness brought about by partial (or complete) dissolution of the Co component from the PdCoAu alloy surface.

TERNARY EXAMPLE 3

Figure 7:
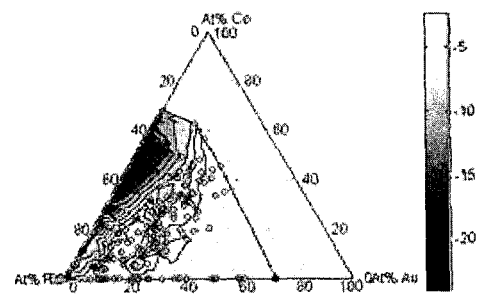
FIG. 7 plots the steady-state oxygen reduction currents at (a) 0.70 V, (b) 0.75 V, and (c) 0.80 V vs. RHE in 0.5 M $HClO_4$ (aq) for the entire PdCoAu binary and ternary phase space investigated, as discussed in TERNARY EXAMPLE 3. The z-axes in each case are in µA.
Figure 7:
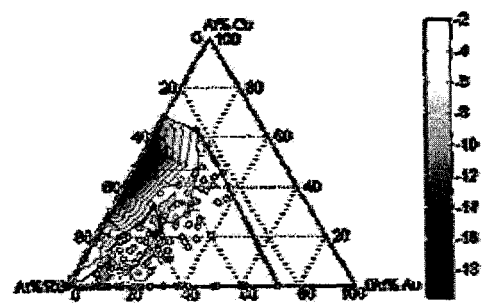
Figure 7:
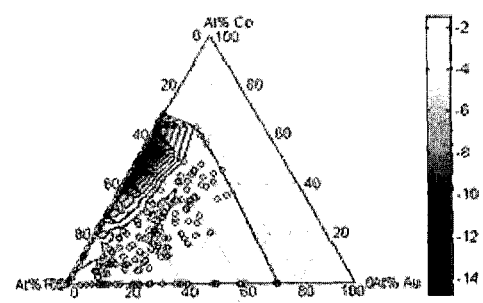

The steady state ORR currents for all 3 of the PdCoAu ternary arrays were measured as well as the PdCo and PdAu binary arrays and Pd only arrays. The steady-state oxygen reduction currents at (a) 0.70 V, (b) 0.75 V, and (c) 0.80 V vs. RHE are shown in FIG. 7 in 0.5 M HClO4(aq). It is clear from FIG. 7 that the region of highest activity is along the binary axis and in the composition range of 40 to 60 At. % Pd and that there was a decrease in activity upon addition of increasing amounts of Au to the alloys. However that the high activity of the alloy is maintained at up to 20 At. % Au is an interesting result given that PdAu binary system is very inactive for compositions with <90 At. % Pd.

TERNARY EXAMPLE 4

Figure 8:
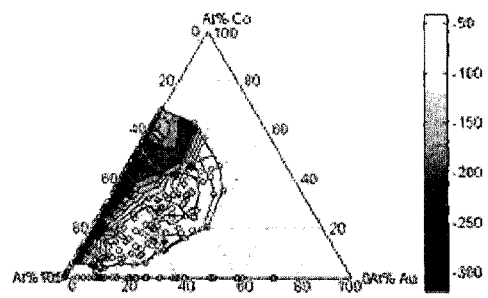
FIG. 8 plots the specific current densities for the steady-state oxygen reduction at (a) 0.70 V, (b) 0.75 V, and (c) 0.80 V vs. RHE in 0.5 M $HClO_4$ (aq) for the entire PdCoAu binary and ternary phase space investigated, as discussed in TERNARY EXAMPLE 4. The z-axes in each case are in $\mu A\ cm^{-2}$.
Figure 8:
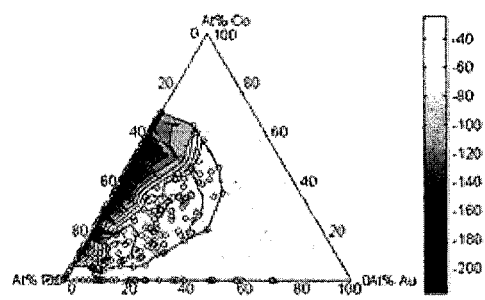
Figure 8:
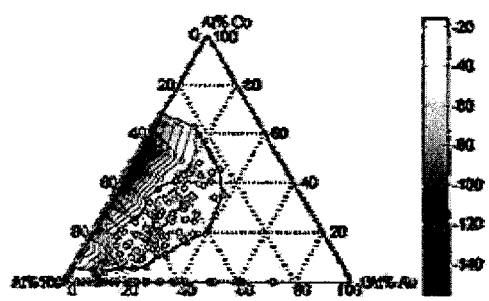

The data of TERNARY EXAMPLE 3 was reworked as specific activities, again calculated using the surface areas estimates from CO oxidative stripping charges (as explained in BINARY EXAMPLE 2). The currents of FIG. 7 were converted to specific current densities, which are shown in FIG. 8. After conversion there remained a peak in ORR activity along the PdCo binary axis and in the composition range of 40 to 60 At. % Pd. Although there was a decrease in activity upon addition of increasing amounts of Au to the alloys, that the extremely high activity of the binary system was extended into the ternary phase space for up to 20 At. % Au, albeit at decreased activities, is an interesting result.

TERNARY EXAMPLE 5

Figure 9:
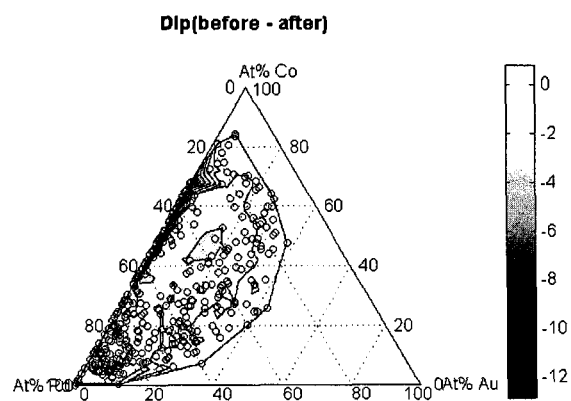
FIG. 9 plots (a) the change in the surface oxide reduction peak current taken from cyclic voltammograms recorded before and after oxygen reduction screening in 0.5 M $HClO_4$ (aq), (b) the same data as (a) but with the binary data removed to allow rescale for smaller current changes as discussed in TERNARY EXAMPLE 5. The in z-axes in each case are in $\mu A$.
Figure 9:
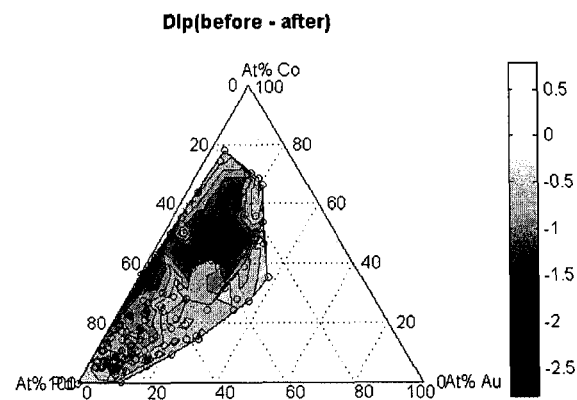

The difference between the peak current for the surface oxide reduction of the samples from the cyclic voltammograms recorded before and after the oxygen reduction screening experiments in 0.50 M $HClO_4$ (aq) were taken as a preliminary indication of sample stability, and plotted in FIG. 9. In FIG. 9(a) the data from the binary and ternary arrays are plotted together. It is clear that the change in surface oxide reduction peak current was substantially larger for the binary alloy system (also shown in FIG. 4 for the binary system) than for the ternary systems and was greatest for the binary at the most active composition. In FIG. 9(b) the same data for the ternary alloys only is plotted. By comparing the current scales for the two plots, it is apparent that the change in surface oxide peak currents was greatly reduced for all ternary alloys. Also by comparing to FIG. 8, it is noted that the region of high activity for ternary system extends beyond the region in FIG. 9 where there was greatest difference between the before and after peak current. Given that the difference between the peak currents for the surface oxide reduction measured before and after the steady state ORR experiments is believed to indicate the stability of the samples, this observation is considered to highlight a region of the PdCoAu phase space where there is both good specific activity and good stability (including corrosion resistance).

BINARY EXAMPLE 4

Figure 10:
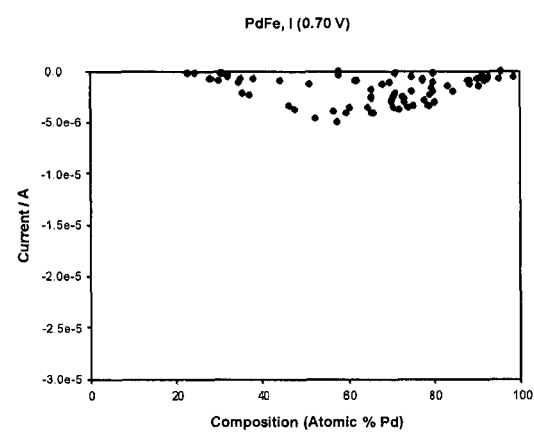
FIG. 10 plots steady-state currents for the reduction of oxygen for the PdFe binary system in 0.50 M $HClO_4$ (aq) at 0.70 V vs. RHE, as discussed in BINARY EXAMPLE 4.

The steady state current for oxygen reduction was measured for an array of compositions for the PdFe binary system at 0.70 V vs. RHE. FIG. 10 shows the steady state currents for oxygen reduction at 0.70 V vs. RHE. The data show there was a clear maximum in the oxygen reduction activity for compositions of PdFe with between 50 and 60 At. % Pd.

TERNARY EXAMPLE 6

By analogy with the findings of TERNARY EXAMPLE 5 relative to BINARY EXAMPLEs 1 to 3 it is expected that the active regions found in BINARY EXAMPLE 4 can be developed into areas of activity and stability by addition of Au as a further alloying element. Thus, it is predicted that the PdFeAu ternary alloy system, when prepared and tested as for the PdCoAu alloys described above, will also exhibit a region where there is both good specific activity and good stability (including corrosion resistance). From the binary PdFe data, compositions of from 50-70 At. % Pd, 50-30 At. % Fe and 0-20 At. % Au will be of interest.

BINARY EXAMPLE 5

PdCr Binary: Oxygen Reduction Reaction

Figure 12:
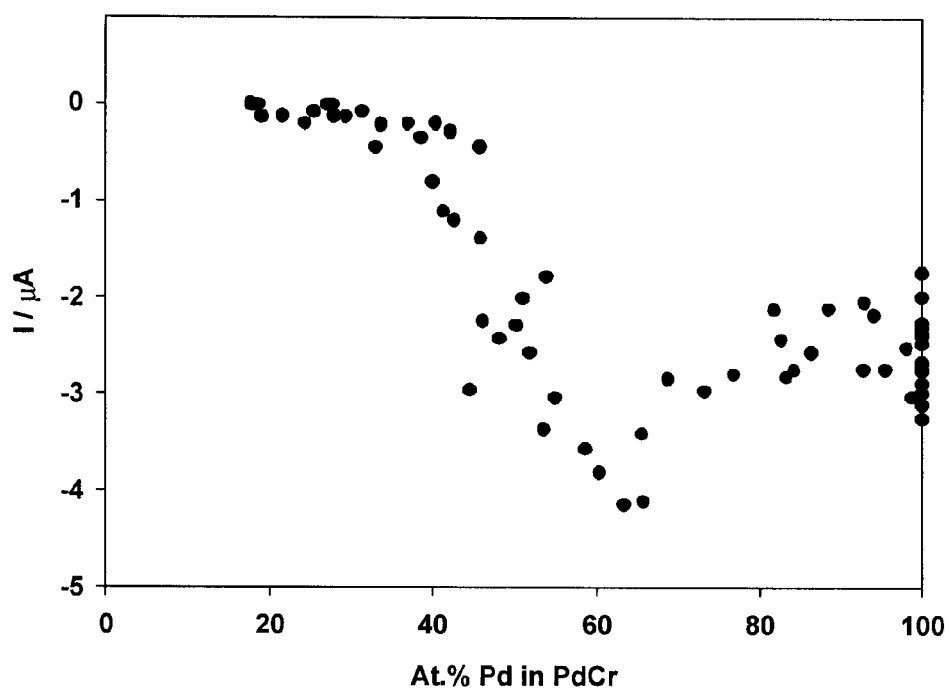
FIG. 12 plots current vs. composition for the reduction of oxygen at 0.70 V vs. RHE in 0.5 M $HClO_4$ (aq) for the PdCr binary system, as discussed in BINARY EXAMPLE 5.
Figure 13:
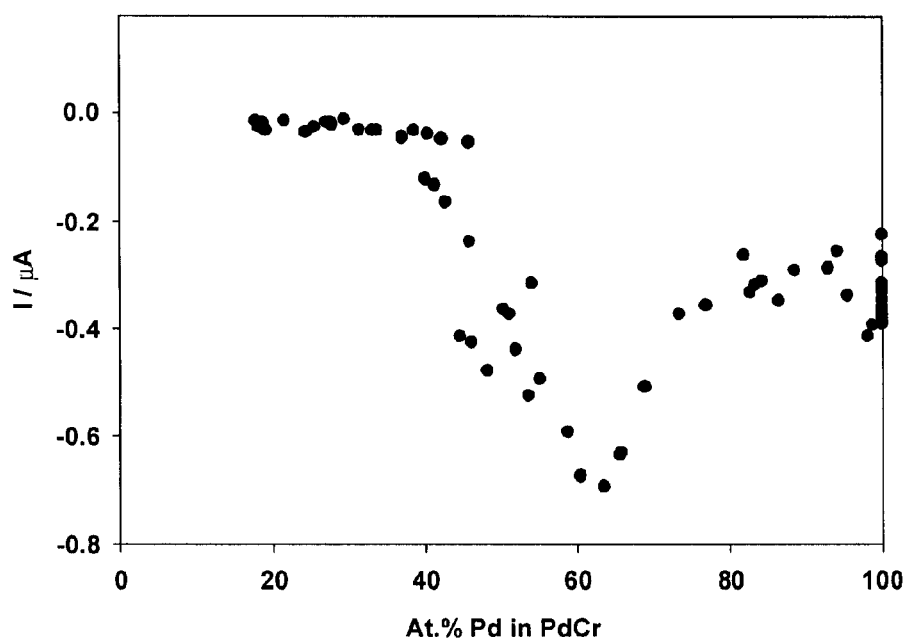
FIG. 13 plots current vs. composition for ORR at 0.80 V vs. RHE in 0.5 M $HClO_4$ (aq) for the PdCr binary system, as discussed in BINARY EXAMPLE 5.

The steady state current for oxygen reduction was measured for PdCr binary arrays at 0.70 V and 0.80 V vs. RHE in 0.5 M $HClO_4$ (aq). FIGS. 12 and 13 show the steady state currents for oxygen reduction at 0.70 V and 0.80 V vs. RHE respectively. The data show a clear maximum in the oxygen reduction activity for compositions of PdCr with between 55 and 65 At. % Pd.

BINARY EXAMPLE 6

PdCr Binary: Oxygen Reduction Reaction in Presence of Methanol

Figure 14:
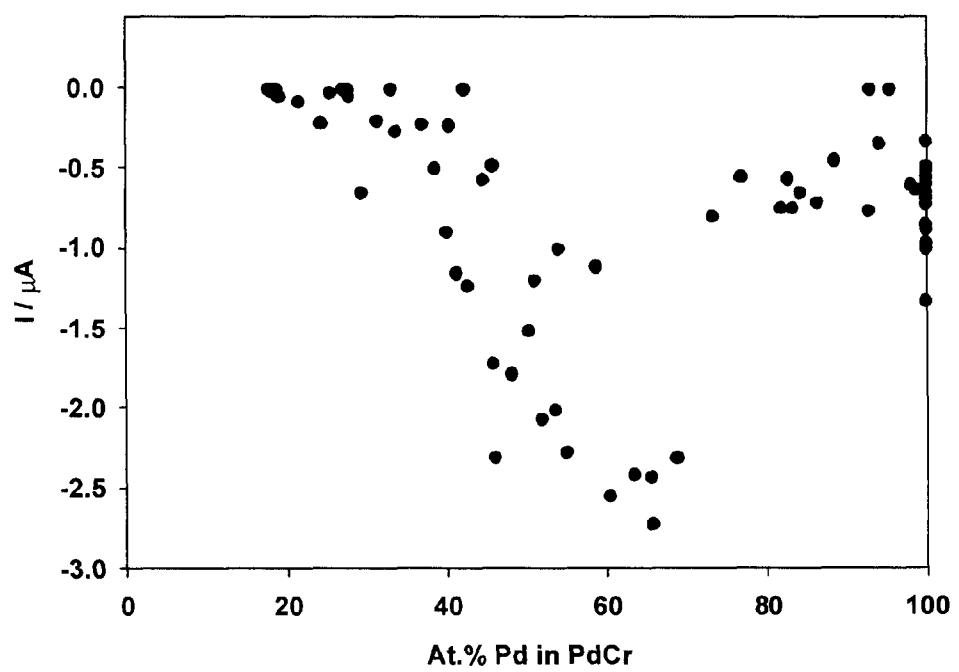
FIG. 14 plots current vs. composition for ORR at 0.70 V vs. RHE in 0.5 M $HClO_4$ (aq)+0.5 M methanol for the PdCr binary system, as discussed in BINARY EXAMPLE 6.
Figure 15:
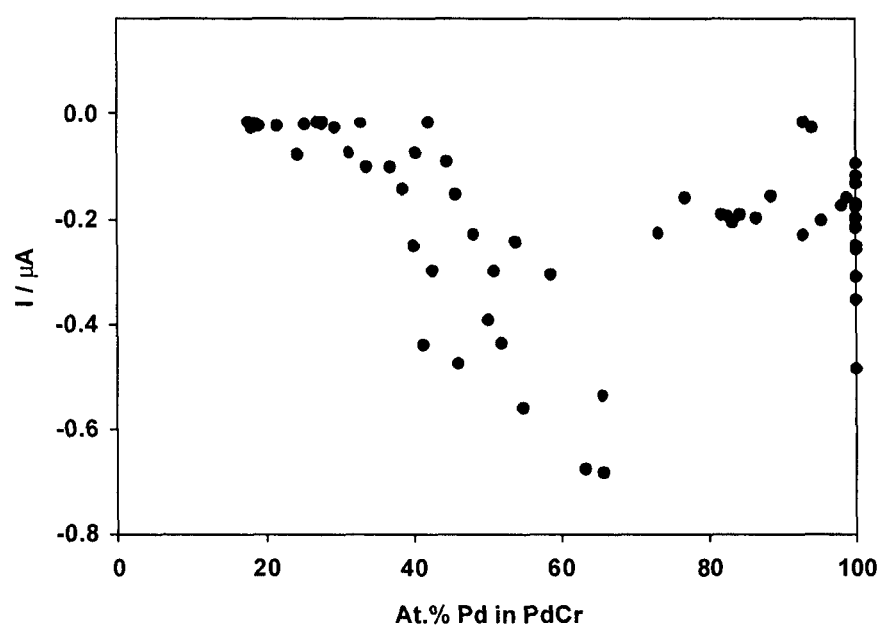
FIG. 15 plots current vs. composition for ORR at 0.80 V vs. RHE in 0.5 M $HClO_4$ (aq)+0.5 M methanol for the PdCr binary system, as discussed in BINARY EXAMPLE 6.

The same electrochemical measurements were done in the presence of methanol. The steady state current for oxygen reduction was measured for PdCr binary system at 0.70 V and 0.80 V vs. RHE in 0.5 M $HClO_4$ (aq)+0.5 M methanol. FIGS. 14 and 15 show the steady state currents for oxygen reduction at 0.70 V and 0.80 V vs. RHE respectively. The data show a clear maximum in the oxygen reduction activity for compositions of PdCr between 50 and 70 At. % Pd and also show that the binary system is methanol tolerant.

TERNARY EXAMPLE 7

PdCoCr Ternary: Oxygen Reduction Reaction

Figure 16:
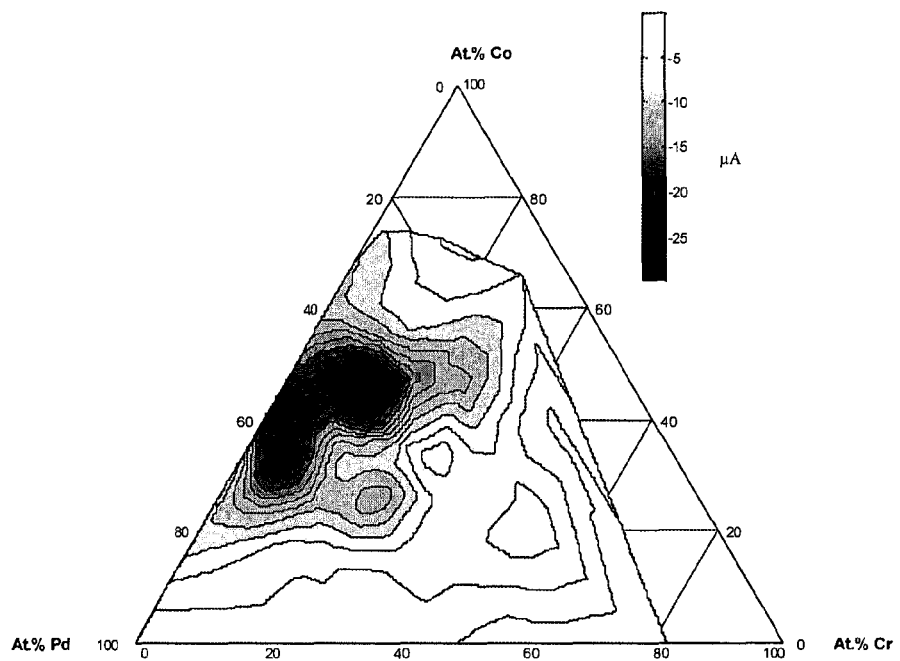
FIG. 16 plots the steady state oxygen reduction currents for the PdCoCr films and associated binary compositions at 0.70 V vs. RHE in 0.5 M $HClO_4$ (aq), as discussed in Ternary Example 7.
Figure 17:
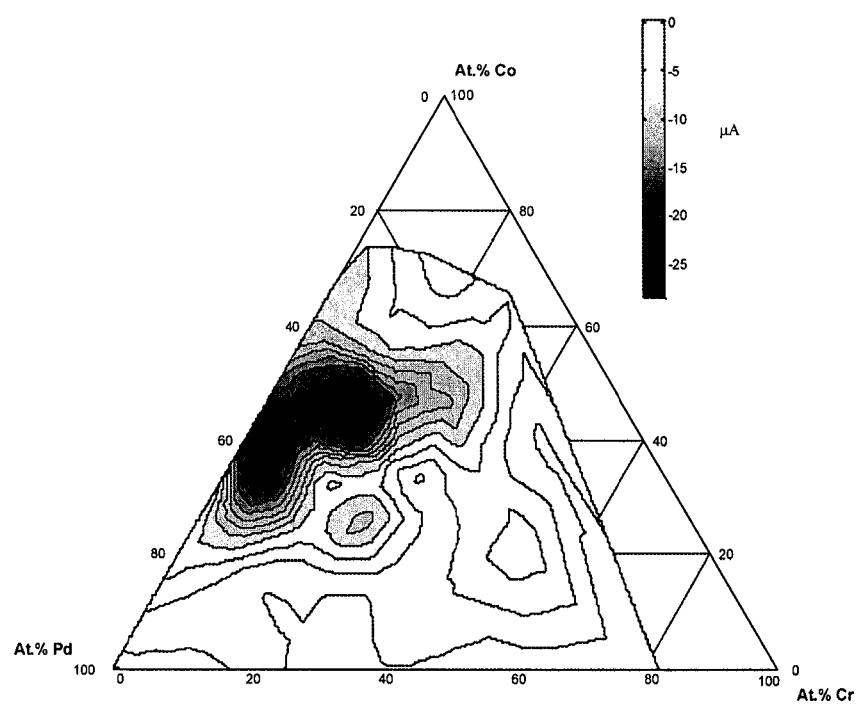
FIG. 17 plots the steady state oxygen reduction currents for the PdCoCr films and associated binary compositions at 0.75 V vs. RHE in 0.5 M $HClO_4$ (aq), as discussed in Ternary Example 7.
Figure 18:
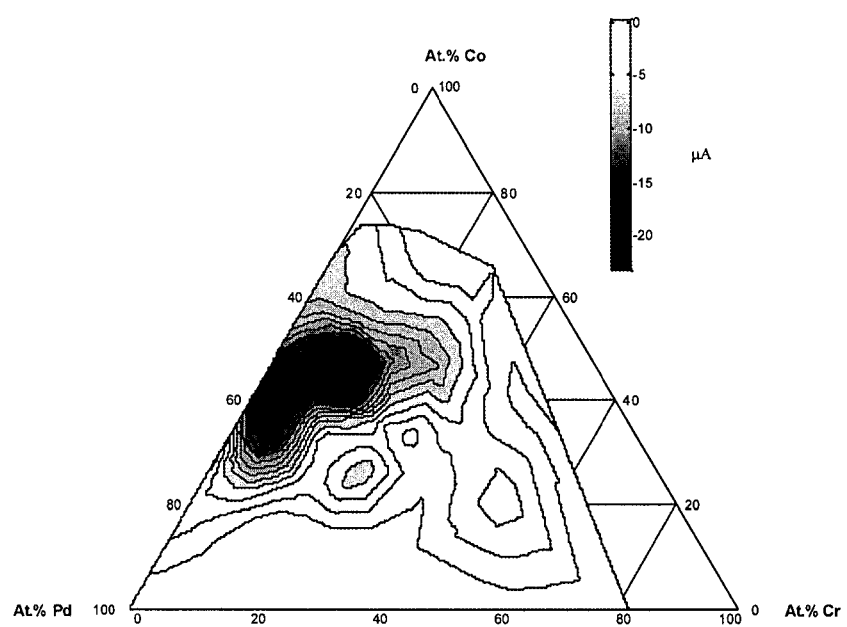
FIG. 18 plots the steady state oxygen reduction currents for the PdCoCr films and associated binary compositions at 0.80 V vs. RHE in 0.5 M $HClO_4$ (aq), as discussed in Ternary Example 7.

The steady state current for the oxygen reduction reaction of PdCoCr arrays was investigated in 0.5 M $HClO_4$ (aq). For the entire binary and ternary phase space investigated, the steady-state oxygen reduction currents at 0.70 V, 0.75 V and 0.80 V vs. RHE are respectively shown in FIGS. 16, 17 and 18.

It is clear from those Figures that the region of highest activity is in the composition range of 40 to 80 At. % Pd. The high activity is also maintained at up to 30 At. % Cr.

TERNARY EXAMPLE 8

PdCoCr Ternary: Electrochemical Area

Figure 19:
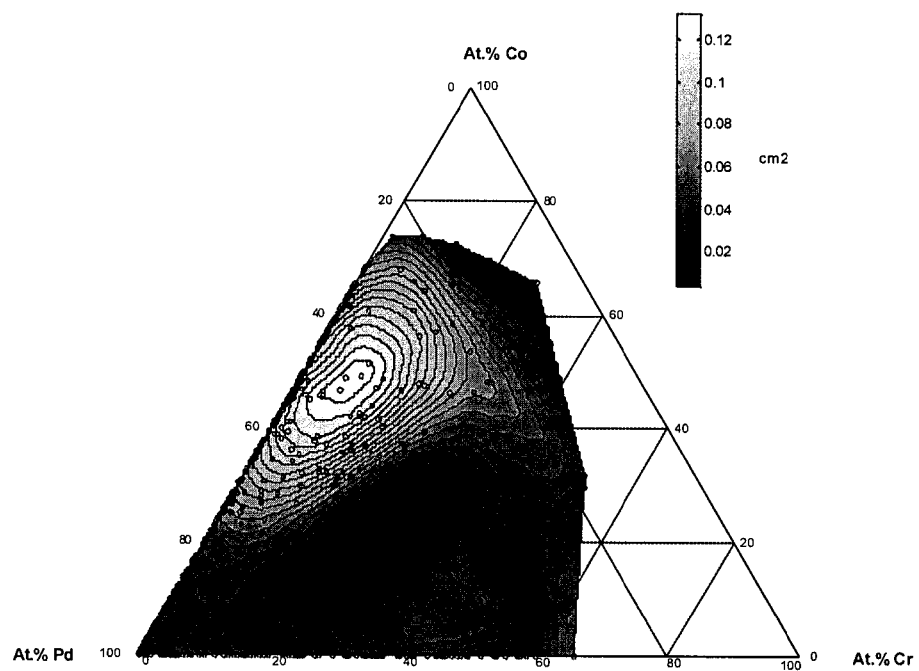
FIG. 19 shows the electrochemical surface area of PdCoCr system, as discussed in TERNARY EXAMPLE 8. The areas were estimated from the CO oxidation charge as explained in BINARY EXAMPLE 2.

The electrochemical surface areas of the entire binaries (PdCo and PdCr) and ternary (PdCoCr) system were estimated from carbon monoxide oxidative stripping charges as explained in BINARY EXAMPLE 2. FIG. 19 plots the data of surface area for the PdCo, PdCr binaries and PdCoCr ternaries. The data show that there is a high surface area region at 30-60 At. % Pd and 30-70 At. % Co and less than 20 At. % Cr. However a more stable region appears with the amount of Co decreased to 10-30 At. % and the amount of Cr increased to 20-40 At. %.

TERNARY EXAMPLE 9

PdCoCr Ternary: Specific Activity

Figure 20:
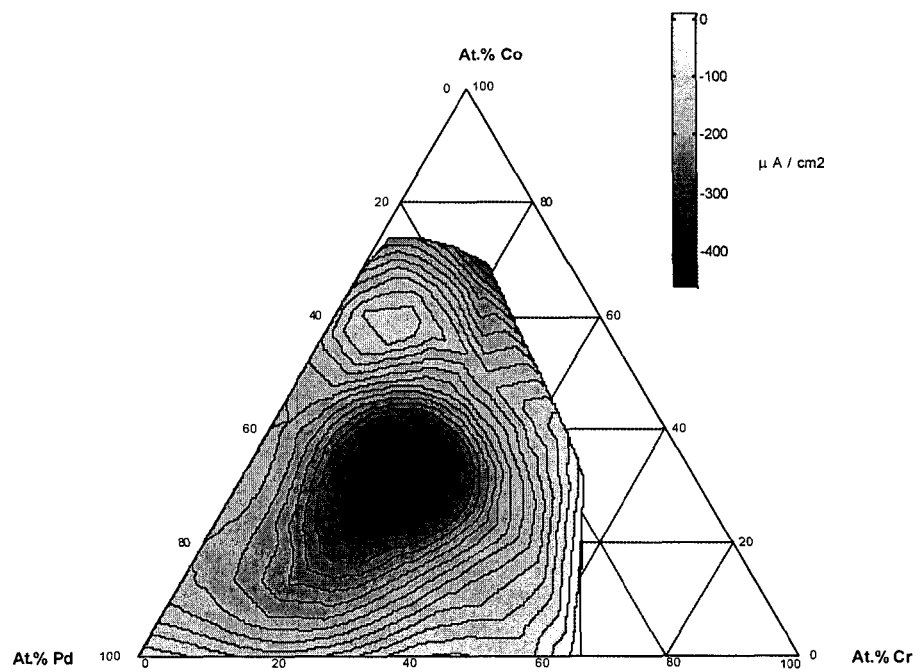
FIG. 20 plots the steady-state oxygen reduction specific current densities for the entire binary and ternary phase space of PdCoCr investigated at 0.70 V vs. RHE in 0.5 M HClO4 (aq), as discussed in TERNARY EXAMPLE 9.
Figure 21:
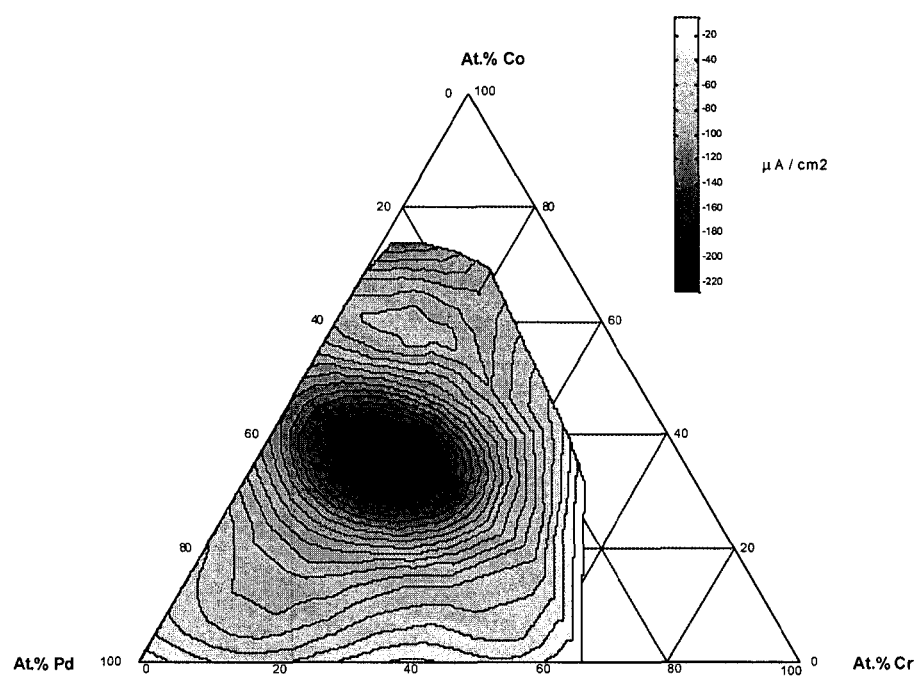
FIG. 21 plots the steady-state oxygen reduction specific current densities for the PdCoCr and associated binary compositions at 0.80 V vs. RHE in 0.5 M $HClO_4$ (aq), as discussed in TERNARY EXAMPLE 9.

The data of TERNARY EXAMPLE 7 was reworked as specific activities as explained in TERNARY EXAMPLE 4. Plots of the steady-state oxygen reduction current densities for the PdCoCr films at 0.70 V and 0.80 V vs. RHE in 0.5 M $HClO_4$ (aq) are shown in FIGS. 20 and 21 respectively. Upon addition of up to 40 At. % Cr the activity of PdCoCr alloys was maintained.

TERNARY EXAMPLE 10

PdCoW Ternary: Oxygen Reduction Reaction

Figure 24:
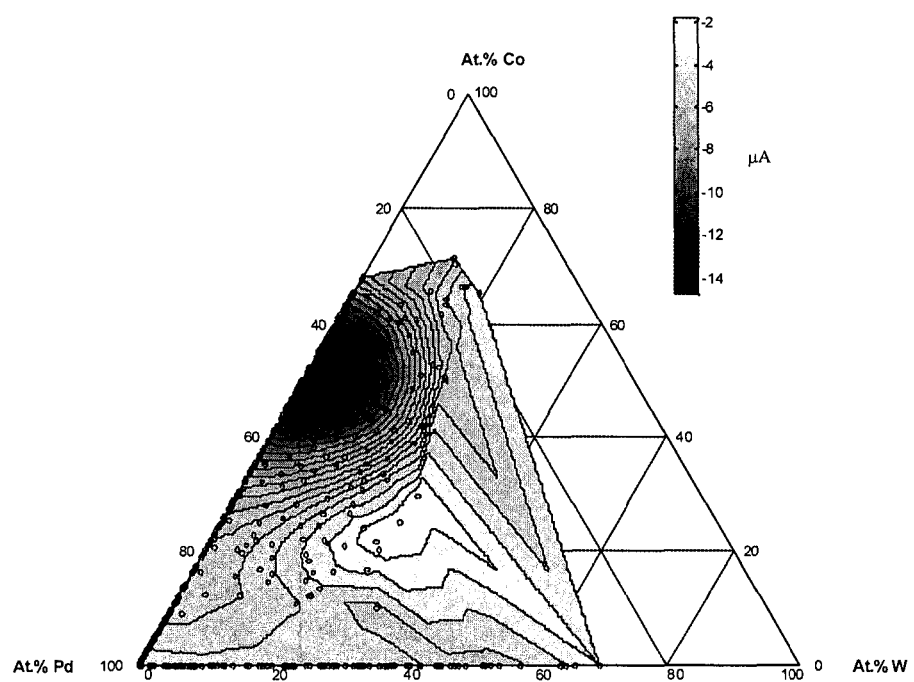
FIG. 24 is a plot of the steady state oxygen reduction currents for the PdCo, PdW and PdCoW films at 0.70 V vs. RHE in 0.5 M HClO4(aq), as discussed in TERNARY EXAMPLE 10.
Figure 25:
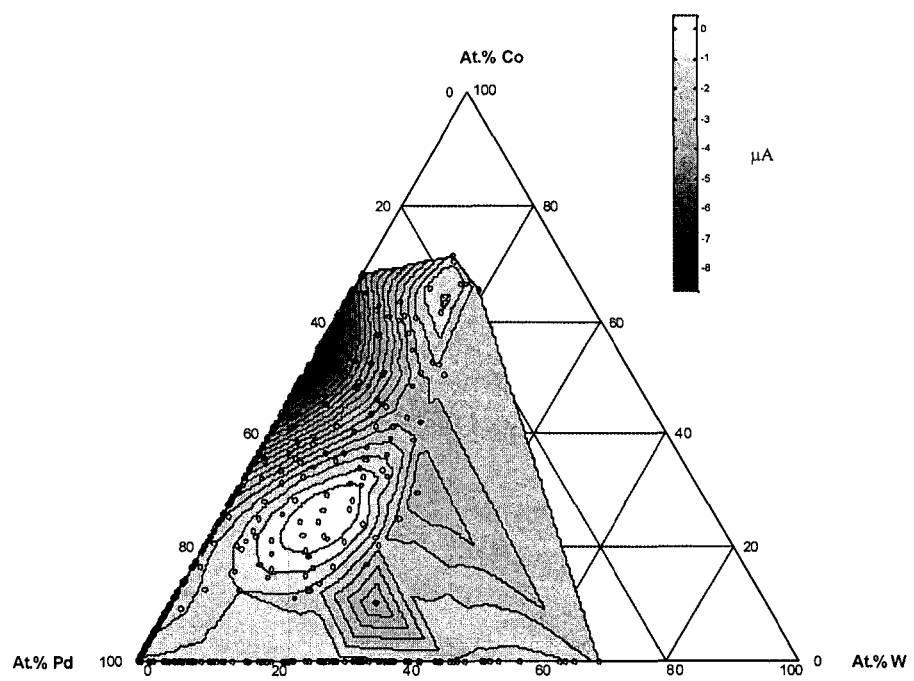
FIG. 25 is a plot of the steady state oxygen reduction currents for the entire PdCoW binary and ternary phase space investigated at 0.80 V vs. RHE in 0.5 M $HClO_4$ (aq), as discussed in TERNARY EXAMPLE 10.

The steady state current for the oxygen reduction reaction of PdCoW arrays was investigated in 0.5 M $HClO_4$ (aq). For the entire binary and ternary phase space investigated, the steady-state oxygen reduction currents at 0.70 V and 0.80 V vs. RHE are shown in FIGS. 24 and 25 respectively. It is clear from those figures that the region of highest activity is in the composition range of 30 to 70 At. % Pd. The high activity is also maintained at up to 20 At. % W.

TERNARY EXAMPLE 11

PdCoW Ternary: Electrochemical Area

Figure 26:
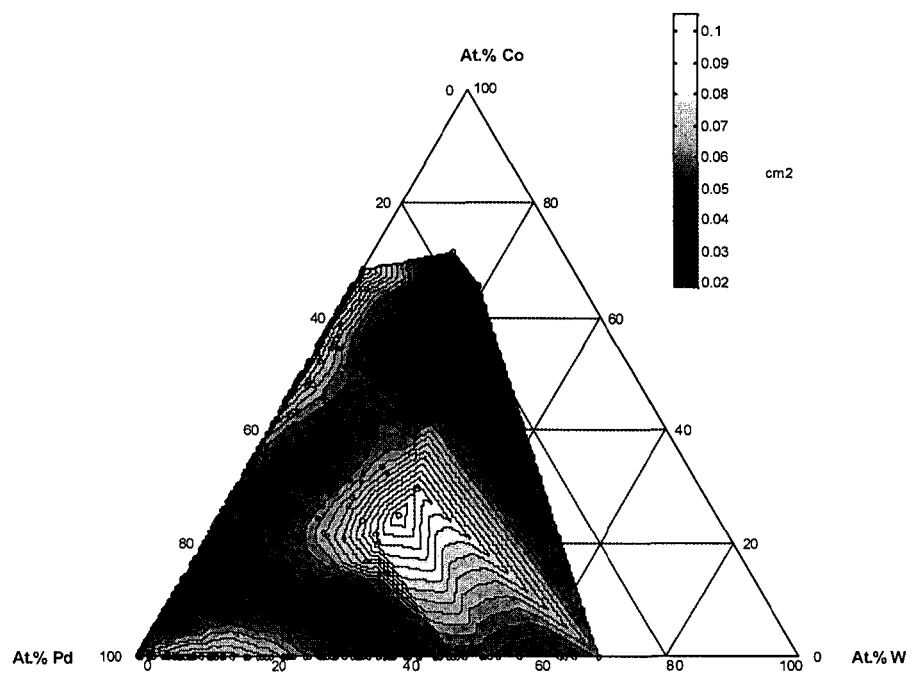
FIG. 26 shows the electrochemical surface area of the PdCoW system, as discussed in TERNARY EXAMPLE 11. The areas were estimated from the CO oxidation charge as explained in BINARY EXAMPLE 2.

The electrochemical surface areas of the entire binaries (PdCo and PdW) and ternary (PdCoW) system were estimated from carbon monoxide oxidative stripping charges as explained in BINARY EXAMPLE 2. FIG. 26 plots the data of surface area for the PdCo, PdW binaries and PdCoW ternaries. The data show that there is a high surface area region for alloys containing more than 20 At. % W. However a more stable region appears for alloys with 30-80 At. % Pd, less than 40 At. % Co and less than 30 At. % W.

TERNARY EXAMPLE 12

PdCoW Ternary: Specific Activity

Figure 27:
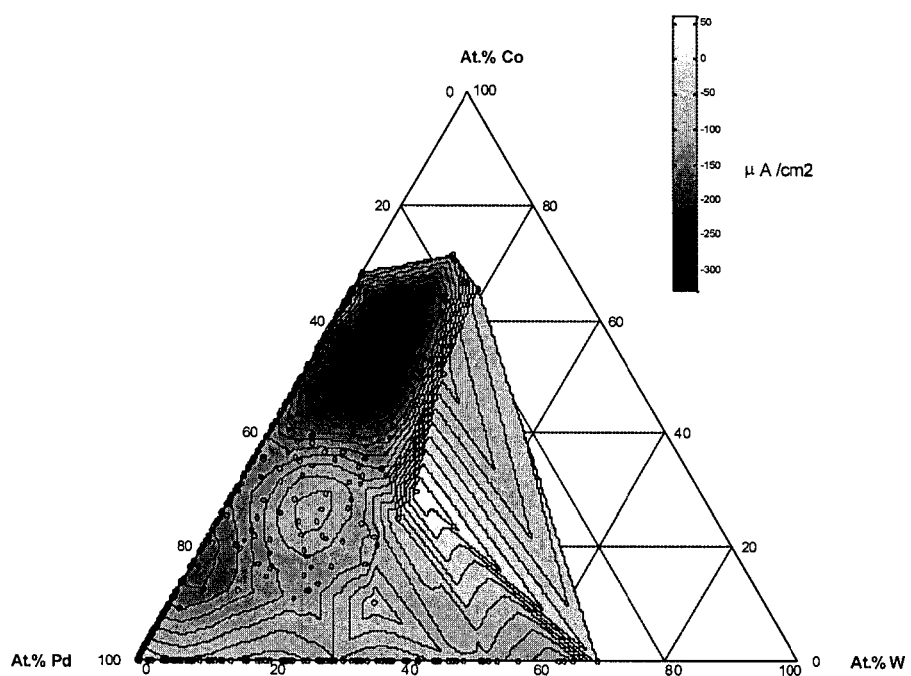
FIG. 27 is a plot of the steady-state oxygen reduction current densities for the PdCo, PdW and PdCoW films at 0.70 V vs. RHE in 0.5 M $HClO_4$ (aq), as discussed in TERNARY EXAMPLE 12.
Figure 28:
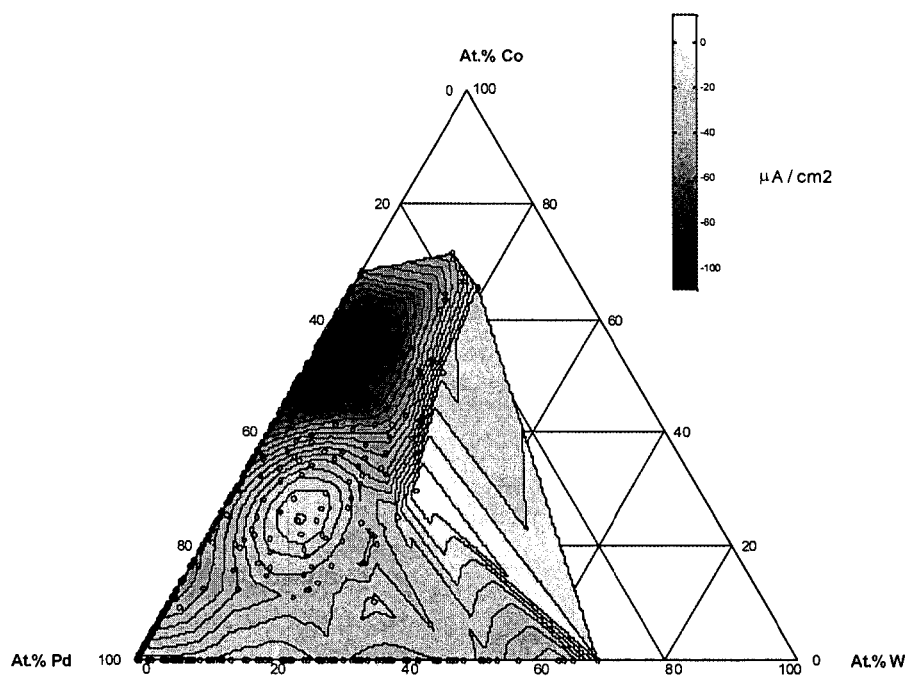
FIG. 28 is a plot of the steady-state oxygen reduction current densities for the PdCo, PdW and PdCoW films at 0.80 V vs. RHE in 0.5 M $HClO_4$ (aq), as discussed in TERNARY EXAMPLE 12.

The data of TERNARY EXAMPLE 12 was reworked as specific activities as explained in TERNARY EXAMPLE 4. Plot of the steady-state oxygen reduction current densities for the PdCoW films at 0.70 V and 0.80 V vs. RHE in 0.5 M $HClO_4$ (aq) are shown in FIGS. 27 and 28 respectively. As illustrated in those figures, the most active alloys contain 20-60 At. % Pd, 30-70 At. % Co and 0-30 At. % W.

TERNARY EXAMPLE 13

Stability Measurement

Figure 29:
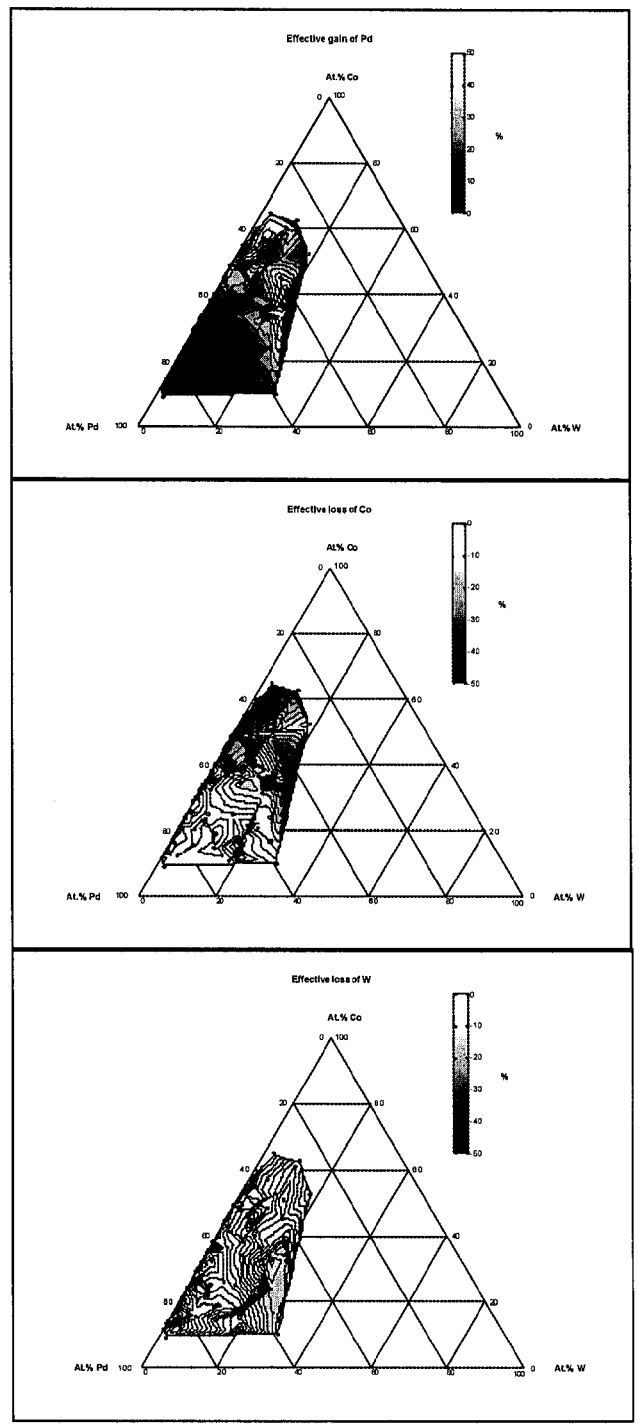
FIG. 29 shows the composition change of a PdCoW ternary array after an electrochemical screening as measured by EDS before and after screening, as discussed in TERNARY EXAMPLE 13.

Composition changes before and after the electrochemical screening of arrays were monitored by EDS. FIG. 29 shows ternary plots for the effective gain of Pd and Loss of Co and W of a PdCoW ternary array. It clearly shows the instability of Co in the region of 30-60 At. % Pd, resulting in a corresponding effective increase of Pd atomic ratio content. Insignificant loss of W was observed for alloys containing less than 20 At. % W. These results agree with the electrochemical surface area measurements. Both measurements show that the most stable alloys are composed of more than 60 At. % Pd, less than 40 At. % Co and less than 20 At. % W.

TERNARY EXAMPLE 14

PdFeCr Ternary: Oxygen Reduction Reaction

Figure 32:
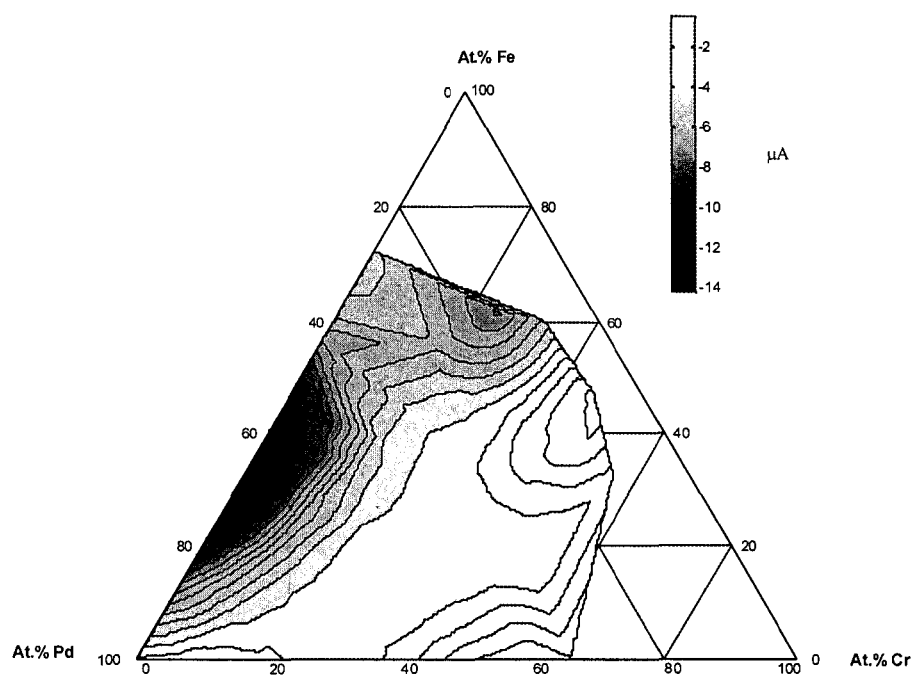
FIG. 32 is a plot of the steady state oxygen reduction currents for the PdFe, PdCr and PdFeCr films at 0.70 V vs. RHE in 0.5 M $HClO_4$ (aq), as discussed in TERNARY EXAMPLE 14.
Figure 33:
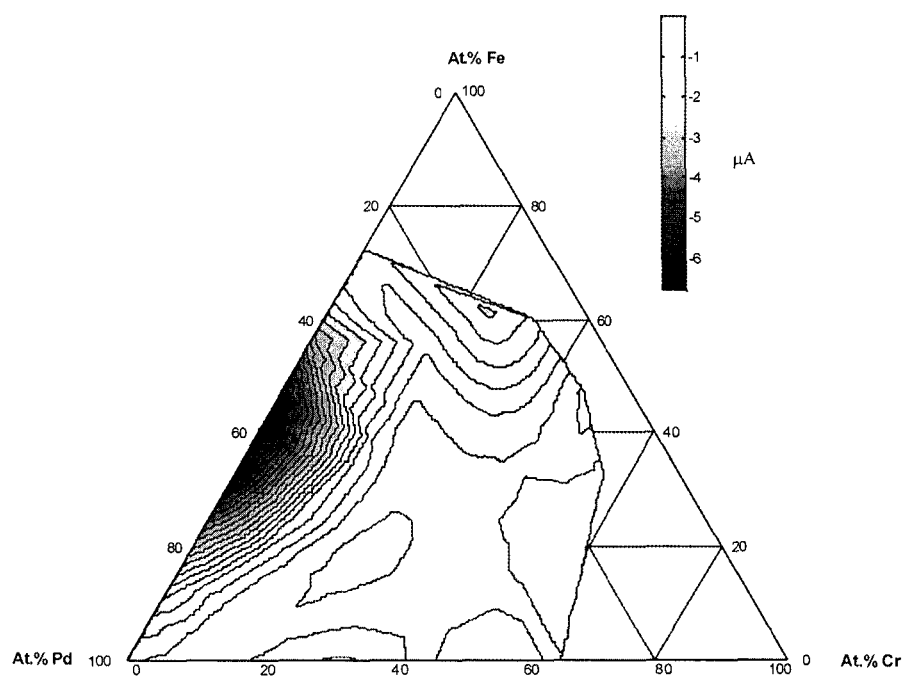
FIG. 33 is a plot of the steady state oxygen reduction currents for the entire PdFeCr binary and ternary phase space investigated at 0.80 V vs. RHE in 0.5 M $HClO_4$ (aq), as discussed in TERNARY EXAMPLE 14.

The steady state current for the oxygen reduction reaction of PdFeCr arrays was investigated in 0.5 M $HClO_4$ (aq). For the entire binary and ternary phase space investigated, the steady-state oxygen reduction currents at 0.70 V and 0.80 V vs. RHE are shown in FIGS. 32 and 33 respectively. The data show that the most active catalysts have a composition of 40-90 At. % Pd, 10-60 At. % Fe and 0-20 At. % Cr.

TERNARY EXAMPLE 15

PdFeCr Ternary: Electrochemical Area

Figure 34:
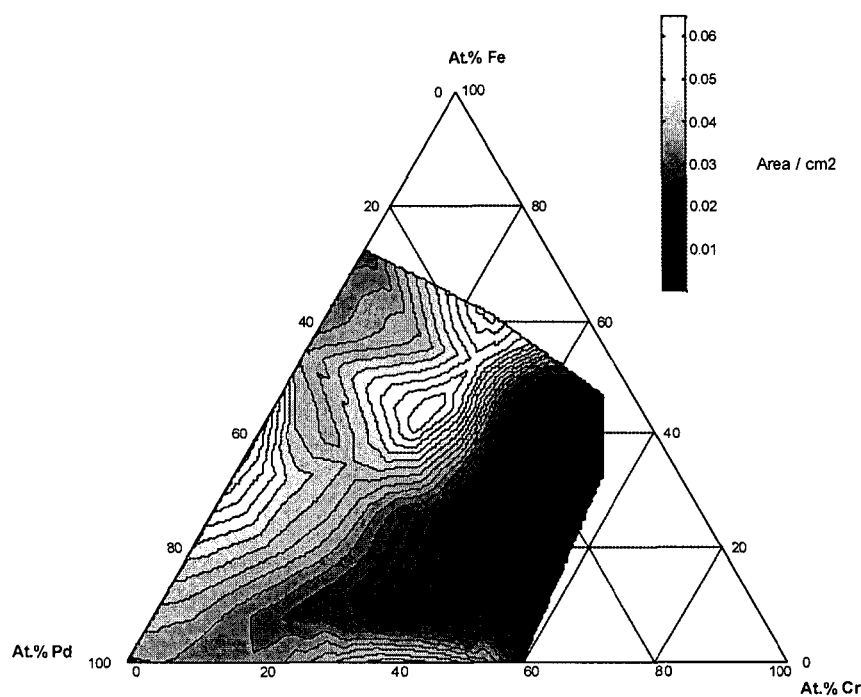
FIG. 34 shows the Electrochemical surface area of PdFeCr system, as discussed in TERNARY EXAMPLE 15.

The electrochemical surface areas of the entire binaries (PdFe and PdCr) and ternary (PdFeCr) system were estimated from carbon monoxide oxidative stripping charges as explained in BINARY EXAMPLE 2. FIG. 34 plots the data of surface area for the PdFe, PdCr binaries and PdFeCr ternaries.

TERNARY EXAMPLE 16

PdFeCr Ternary: Specific Activity

Figure 35:
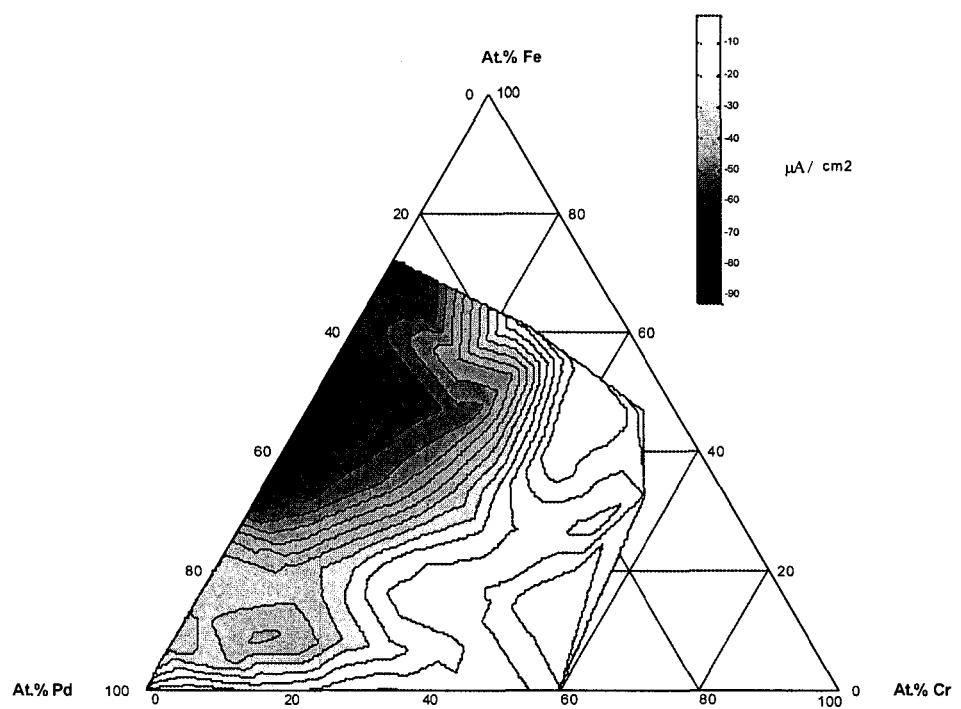
FIG. 35 is a plot of the steady-state oxygen reduction specific current densities for the PdFe, PdCr and PdFeCr films at 0.70 V vs. RHE in 0.5 M $HClO_4$ (aq), as discussed in Ternary Example 16.
Figure 36:
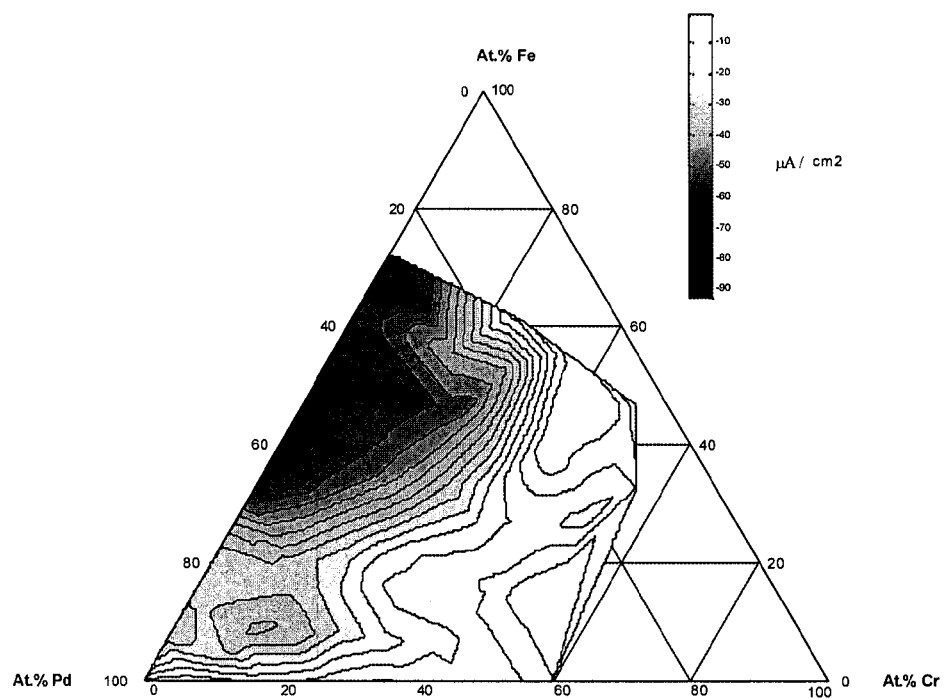
FIG. 36 is a plot of the steady-state oxygen reduction specific current densities for the PdFe, PdCr and PdFeCr films at 0.80 V vs. RHE in 0.5 M $HClO_4$ (aq), as discussed in Ternary Example 16.

The data of TERNARY EXAMPLE 15 was reworked as specific activities as explained in TERNARY EXAMPLE 2. Plot of the steady-state oxygen reduction current densities for the PdFeCr films at 0.70 V and 0.80 V vs. RHE in 0.5 M $HClO_4$ (aq) are shown in FIGS. 35 and 36 respectively. The data show that the most active alloys are composed of 30-80 At. % Pd, 20-70 At. % Fe and 0-40 At. % Cr.

Reference Example 1

Rotating Disc Electrode Study of Thin Film Alloys

From data previously shown in the Binary and TERNARY EXAMPLEs, some thin film alloys were deposited on rotating disc electrodes and screened for oxygen reduction reaction. The compositions of the thin film alloys are listed in Table 1 and were chosen to be in the most active and stable regions noted from the results represented in the Binary and TERNARY EXAMPLEs above.

Titanium discs (5 mm diameter) were used as substrates and were first polished then etched for 15 min in a $HF/HNO_3$ solution (0.5 g NaF, 4.5 mL of 70% $HNO_3$ and 10 mL $H_2O$). Thin films were then deposited onto the titanium discs using the same physical vapour deposition method described earlier. The deposition of thin films onto the disks was carried out without using wedges. Instead, appropriate deposition rates were selected to ensure the deposition of continuous films of constant (and known) compositions across the area of the disc substrate. The substrates were also rotated during deposition to ensure uniform film properties. Using this modified deposition technique it is possible to prepare up to 16 identical thin films on rotation disc electrode substrates. The compositions of all these thin films were confirmed after deposition using EDS.

Figure 38:
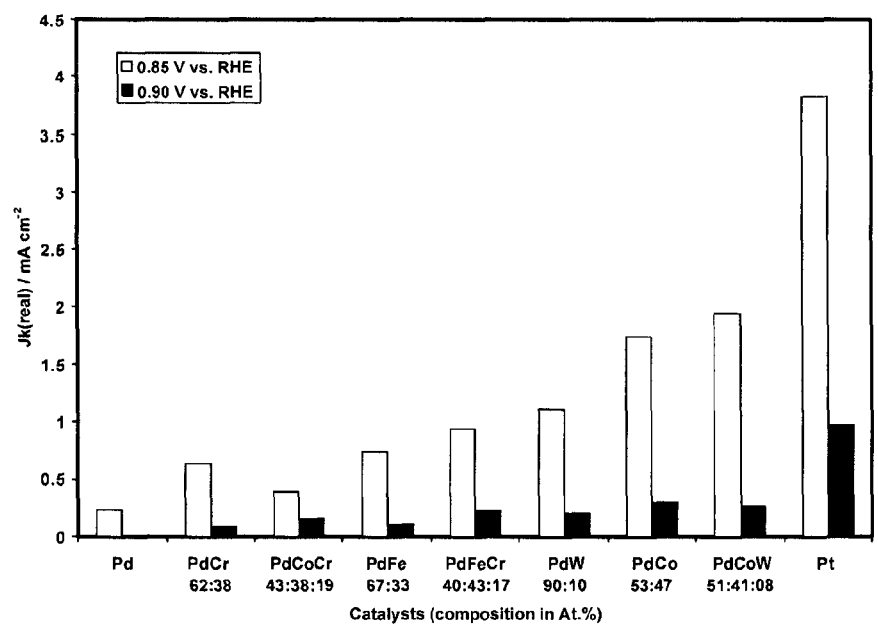
FIG. 38 shows the specific current densities (corrected for mass transport corrected and real surface area of Pd) for the oxygen reduction reaction at 0.85 V and 0.90 V vs. RHE in 0.5 M $HClO_4$ (aq) at 25.degree. C. for the catalysts deposited on rotating disc electrodes. Data obtained with thin films of pure Pt and Pd are shown for comparison; as discussed in Reference Example 1.
Figure 39:
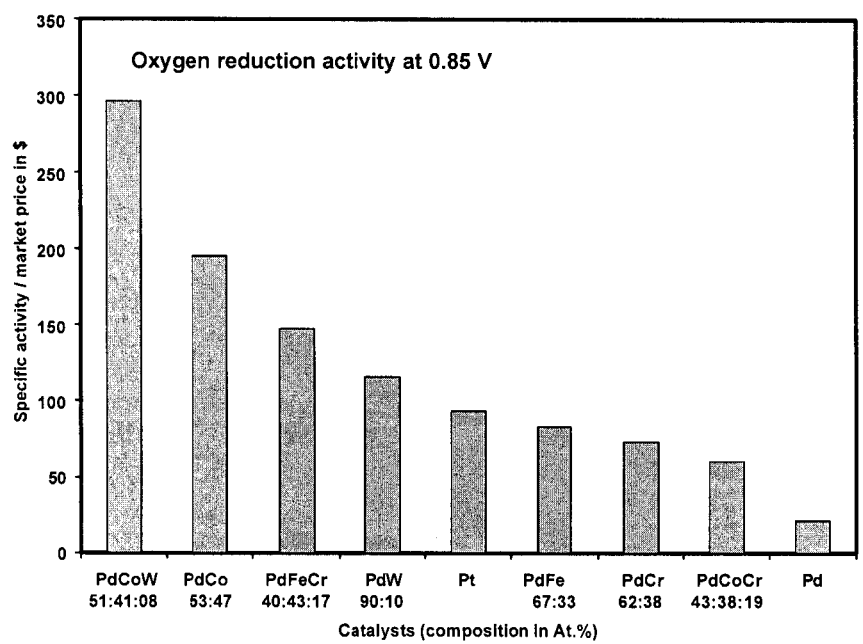
FIG. 39 shows the specific activity for ORR per market price in $ at 0.85 V vs. RHE of all the studied catalysts. Values for pure platinum and palladium are included for comparison.

FIG. 38 shows the specific activity $J_k$ (real) (mass transport corrected, electrochemical surface area specific) for each catalyst at 0.85 and 0.90 V vs. RHE in saturated $O_2$ solution of 0.5 M $HClO_4$ (aq) at 25° C. Data were obtained from cyclic voltammetry measurements in $O_2$ saturated solution at 20 mV $s^{-1}$ with a rotation rate of 900 rpm. Surface areas were obtained from carbon monoxide stripping experiments as explained in BINARY EXAMPLE 2. The compositions of the Pd alloys were chosen to be those which show enhanced activity for oxygen reduction reaction in comparison to pure Pd. PdCoW alloys (51:41:08 At. %) exhibit the highest activity, closely followed by the PdCo binary alloy. The PdCoW alloys were more stable than the PdCo alloys. The costs of specific activity per market price (in $) at 0.85 V vs. RHE of all the studied catalysts are summarised in FIG. 39. The price of the catalysts in $/g (at September 2006 market price) were calculated from their compositions converted in weight % and the appropriate raw metal costs. The costs of materials processing into practical dispersed catalysts are not included in this calculation. Similar cost values based on the results obtained with pure platinum and palladium are also included for comparison.

TABLE 1 Composition of the alloys synthesised for rotating disc electrode studies.

| Alloy | Composition (measured by EDS) |
| --- | --- |
| PdCo | 53 At. % Pd, 47 At. % Co |
| PdCr | 62 At. % Pd, 38 At. % Cr |
| PdW | 90 At. % Pd, 10 At. % W |
| PdFe | 67 At. % Pd, 33 At. % Fe |
| PdCoCr | 43 At. % Pd, 38 At. % Co, 19 At. % Cr |
| PdCoW | 51 At. % Pd, 41 At. % Co, 08 At. % Cr |
| PdFeCr | 40 At. % Pd, 43 At. % Fe, 17 At. % Cr |

The invention claimed is:

1. A fuel cell comprising a metal alloy catalyst consisting essentially of the metals Pd, M1, and M2, where M1 and M2 are different metals selected from Fe, Cr, and W.

2. The fuel cell of claim 1, wherein M1 is Fe.

3. A fuel cell comprising a catalyst consisting essentially of 40 to 60 atomic percentage (at %) Pd, 40 to 60 at % Co, and up to 30 at % Cr.

4. A fuel cell comprising a catalyst consisting essentially of 30 to 60 atomic percentage (at %) Pd, 30 to 70 at % Co, and less than 20 at % Cr.

5. A fuel cell comprising a catalyst consisting essentially of Pd, Co, and W.

6. The fuel cell of claim 5, wherein the catalyst consists essentially of 60 atomic percentage (at %) or more Pd, 40 at % or less Co, and up to 20 at % W.

7. The fuel cell of claim 1, wherein the catalyst consists essentially of Pd, Fe, and Cr.

8. The fuel cell of claim 7, wherein the catalyst consists essentially of 40 to 80 atomic percentage (at %) Pd, 20 to 60 at % Fe, and up to 20 at % Cr.

9. The fuel cell of claim 7, wherein the catalyst consists essentially of 30 to 80 atomic percentage (at %) Pd, 20 to 70 at % Fe, and up to 40 at % Cr.

10. A cathode for a fuel cell, the cathode comprising a cathode support, and a metal alloy catalyst consisting essentially of the metals Pd, M1, and M2, where M1 and M2 are different metals selected from Fe, Cr, and W.

11. A membrane-electrode assembly for a fuel cell, the assembly comprising a proton exchange membrane, an anode, and the cathode of claim 10.

12. A fuel cell comprising at least one membrane electrode assembly of claim 11.

13. The fuel cell of claim 1, wherein the fuel cell is a direct methanol fuel cell (DMFC) and the catalyst is provided for the oxygen reduction reaction (ORR).

14. A fuel cell comprising a ternary metal alloy catalyst, the alloy consisting essentially of 30 to 80 atomic percentage (at %) Pd, 10 to 30 at % Co, and 20 to 40 at % Cr.

15. A cathode for a fuel cell comprising a cathode support and a metal alloy catalyst consisting essentially of Pd, Co, and W.

16. The cathode of claim 15, wherein the metal alloy catalyst consists essentially of 60 atomic percentage (at %) or more Pd, 40 at % or less Co, and up to 20 at % W.

17. A membrane-electrode assembly for a fuel cell, the assembly comprising a proton exchange membrane, an anode, and the cathode of claim 15.

18. A membrane-electrode assembly for a fuel cell, the assembly comprising a proton exchange membrane, an anode, and the cathode of claim 16.

19. A fuel cell comprising at least one membrane electrode assembly of claim 17.

20. A fuel cell comprising at least one membrane electrode assembly of claim 18.

21. A cathode for a fuel cell comprising a cathode support and a metal alloy catalyst, wherein the metal alloy catalyst is a ternary alloy consisting essentially of 40 to 60 atomic percentage (at %) Pd, 40 to 60 at % Co, and up to 30 at % Cr; a ternary alloy consisting essentially of 30 to 60 at % Pd, 30 to 70 at % Co, and less than 20 at % Cr; or a ternary alloy consisting essentially of 30 to 80 at % Pd, 10 to 30 at % Co, and 20 to 40 at % Cr.

22. A membrane-electrode assembly for a fuel cell, the assembly comprising a proton exchange membrane, an anode, and the cathode of claim 21.

23. A fuel cell comprising at least one membrane electrode assembly of claim 22.

24. The fuel cell of claim 3, wherein the fuel cell is a direct methanol fuel cell (DMFC) and the catalyst is provided for the oxygen reduction reaction (ORR).

25. The fuel cell of claim 4, wherein the fuel cell is a direct methanol fuel cell (DMFC) and the catalyst is provided for the oxygen reduction reaction (ORR).

26. The fuel cell of claim 5, wherein the fuel cell is a direct methanol fuel cell (DMFC) and the catalyst is provided for the oxygen reduction reaction (ORR).

27. The fuel cell of claim 6, wherein the fuel cell is a direct methanol fuel cell (DMFC) and the catalyst is provided for the oxygen reduction reaction (ORR).

28. The fuel cell of claim 12, wherein the fuel cell is a direct methanol fuel cell (DMFC) and the catalyst is provided for the oxygen reduction reaction (ORR).

29. The fuel cell of claim 14, wherein the fuel cell is a direct methanol fuel cell (DMFC) and the catalyst is provided for the oxygen reduction reaction (ORR).

* * * * *